United States Patent
Bloch et al.

(10) Patent No.: US 10,800,110 B2
(45) Date of Patent: Oct. 13, 2020

(54) MULTIFUNCTION END EFFECTOR APPARATUS AND METHODS FOR ASSEMBLING THERMOPLASTIC COMPOSITE ARTICLES

(71) Applicant: The Boeing Company, Chicago, IL (US)

(72) Inventors: Daniel D. Bloch, St. Peters, MO (US); Randall D. Wilkerson, O'Fallon, MO (US); Camille D. Carter, St. Louis, MO (US); Zachary L. Green, Edwardsville, IL (US); Nicole R. Williams, O'Fallon, MO (US); Eric Moyes, Belleville, IL (US); Gregory J. S. Hickman, University City, MO (US); Scott E. Martin, Swansea, IL (US)

(73) Assignee: THE BOEING COMPANY, Chicago, IL (US)

( * ) Notice: Subject to any disclaimer, the term of this patent is extended or adjusted under 35 U.S.C. 154(b) by 315 days.

(21) Appl. No.: 15/484,721

(22) Filed: Apr. 11, 2017

(65) Prior Publication Data
US 2018/0290393 A1     Oct. 11, 2018

(51) Int. Cl.
| | | |
|---|---|---|
| *B25J 11/00* | (2006.01) | |
| *B25J 15/00* | (2006.01) | |
| *B29C 65/00* | (2006.01) | |
| *B29C 69/00* | (2006.01) | |
| *B29C 70/00* | (2006.01) | |

(Continued)

(52) U.S. Cl.
CPC .......... *B29C 66/863* (2013.01); *B25J 11/005* (2013.01); *B25J 11/0055* (2013.01);
(Continued)

(58) Field of Classification Search
CPC ....... B25J 11/00; B25J 11/005; B25J 11/0055; B25J 15/00; B25J 15/001; B25J 15/0019; B25J 15/005; B25J 15/0057; B25J 15/006; B25J 15/0066; B25J 15/06; B25J 15/061; B25J 15/0616; B25J 15/069; B25J 15/0691; B29C 65/00; B29C 65/08; B29C 65/70; B29C 65/78; B29C 65/78; B29C 65/7802;
(Continued)

(56) References Cited

U.S. PATENT DOCUMENTS

| | | | | |
|---|---|---|---|---|
| 8,256,480 | B1 * | 9/2012 | Weber ................... | B29C 66/863 |
| | | | | 156/359 |
| 9,216,540 | B2 * | 12/2015 | Weiland ............... | B29C 66/532 |
| 2004/0168559 | A1 * | 9/2004 | Ide .......................... | G11B 7/26 |
| | | | | 83/684 |

FOREIGN PATENT DOCUMENTS

| | | |
|---|---|---|
| EP | 2647463 | 10/2013 |
| EP | 2845701 | 3/2015 |

OTHER PUBLICATIONS

European Patent Office, "Extended European Search Report," issued in connection with European Patent Application No. 18163928.7, dated Sep. 20, 2018, 9 pages.

* cited by examiner

*Primary Examiner* — Jacob T Minskey
*Assistant Examiner* — Matthew Hoover
(74) *Attorney, Agent, or Firm* — Hanley, Flight & Zimmerman, LLC

(57) ABSTRACT

Multifunction end effector apparatus and methods for assembling thermoplastic composite articles are disclosed. An example apparatus for assembling a thermoplastic composite article includes a robot and an end effector coupled to the robot. The end effector includes a cutting head, a vacuum head, and a welding head.

24 Claims, 13 Drawing Sheets

(51) Int. Cl.
  *B32B 37/00* (2006.01)
  *B32B 38/00* (2006.01)
  *B32B 39/00* (2006.01)
  *B25J 15/06* (2006.01)
  *B29C 65/08* (2006.01)
  *B29C 65/78* (2006.01)
  *B32B 38/18* (2006.01)
  *B32B 37/18* (2006.01)
  *B32B 37/06* (2006.01)

(52) U.S. Cl.
  CPC ....... *B25J 15/0019* (2013.01); *B25J 15/0057* (2013.01); *B25J 15/0066* (2013.01); *B25J 15/0616* (2013.01); *B25J 15/0691* (2013.01); *B29C 65/08* (2013.01); *B29C 65/7802* (2013.01); *B29C 65/7847* (2013.01); *B29C 65/7867* (2013.01); *B29C 65/7891* (2013.01); *B29C 66/02241* (2013.01); *B29C 66/1122* (2013.01); *B29C 66/45* (2013.01); *B29C 66/472* (2013.01); *B29C 66/4722* (2013.01); *B29C 66/721* (2013.01); *B29C 66/73921* (2013.01); *B29C 66/836* (2013.01); *B29C 69/005* (2013.01); *B29C 70/00* (2013.01); *B32B 37/06* (2013.01); *B32B 37/182* (2013.01); *B32B 38/0004* (2013.01); *B32B 38/1858* (2013.01); *B32B 39/00* (2013.01); *B32B 2038/1891* (2013.01)

(58) Field of Classification Search
  CPC . B29C 65/784; B29C 65/7847; B29C 65/786; B29C 65/7867; B29C 65/789; B29C 65/7891; B29C 66/00; B29C 66/80; B29C 66/86; B29C 66/863; B29C 66/02; B29C 66/022; B29C 66/0224; B29C 66/02241; B29C 66/10; B29C 66/11; B29C 66/112; B29C 66/1122; B29C 66/40; B29C 66/45; B29C 66/47; B29C 66/472; B29C 66/4722; B29C 66/70; B29C 66/72; B29C 66/721; B29C 66/73; B29C 66/739; B29C 66/7392; B29C 66/73921; B29C 66/83; B29C 66/836; B29C 69/00; B29C 69/005; B29C 70/00; B32B 37/00; B32B 37/06; B32B 37/10; B32B 37/18; B32B 37/18; B32B 37/182; B32B 38/00; B32B 38/0004; B32B 38/10; B32B 38/18; B32B 38/185; B32B 38/1858; B32B 39/00
  See application file for complete search history.

MULTIFUNCTION END EFFECTOR APPARATUS AND METHODS FOR ASSEMBLING THERMOPLASTIC COMPOSITE ARTICLES

FIELD OF THE DISCLOSURE

This disclosure relates generally to multifunction end effector apparatus and methods and, more specifically, to multifunction end effector apparatus and methods for assembling thermoplastic composite articles.

BACKGROUND

Conventional methods of assembling thermoplastic composite articles and/or thermoplastic composite lay ups require a substantial degree of manual labor and/or human involvement in conjunction with performing various aspects, steps and/or stages of the assembly process. For example, such conventional methods commonly require that one or more thermoplastic parts to be incorporated into a thermoplastic composite article be individually cut from one or more sheets and/or plies of thermoplastic material (e.g., thermoplastic stock) by hand with a knife. As another example, such conventional methods also commonly require that individual thermoplastic parts to be incorporated into a thermoplastic composite article be picked up, moved, placed, stacked and/or laid up manually prior to such individual thermoplastic parts being welded to one another to form the thermoplastic composite article. Human involvement in the cutting, picking up, placing, stacking, laying up and/or welding aspects of such conventional methods limits the accuracy and repeatability of the assembly process.

SUMMARY

Multifunction end effector apparatus and methods for assembling thermoplastic composite articles are disclosed herein. In some examples, an apparatus for assembling a thermoplastic composite article is disclosed. In some disclosed examples, the apparatus comprises a robot. In some disclosed examples, the apparatus comprises an end effector coupled to the robot. In some disclosed examples, the end effector includes a cutting head, a vacuum head, and a welding head.

In some disclosed examples, an apparatus for assembling a thermoplastic composite article comprises a robot and an end effector coupled to the robot. In some disclosed examples, the end effector comprises a cutting head including an ultrasonic cutter to cut a first thermoplastic part from a thermoplastic material. In some disclosed examples, the end effector comprises a vacuum head including a vacuum surface to pick up the first thermoplastic part in response to a vacuum force applied at the vacuum surface. In some disclosed examples, the end effector comprises a welding head including an ultrasonic welder to weld the first thermoplastic part to a second thermoplastic part to form the thermoplastic composite article.

In some examples, a method for assembling a thermoplastic composite article via an end effector coupled to a robot is disclosed. In some disclosed examples, the method comprises cutting a first thermoplastic part from a thermoplastic material via an ultrasonic cutter of a cutting head of the end effector. In some disclosed examples, the method comprises picking up the first thermoplastic part by applying a vacuum force to the first thermoplastic part via a vacuum surface of a vacuum head of the end effector. In some disclosed examples, the method comprises moving the first thermoplastic part from a first location to a second location via the vacuum head. In some disclosed examples, the method comprises placing the first thermoplastic part in contact with a second thermoplastic part via the vacuum head. In some disclosed examples, the second thermoplastic part is located at the second location. In some disclosed examples, the method comprises welding the first thermoplastic part to the second thermoplastic part via an ultrasonic welder of a welding head of the end effector to form the thermoplastic composite article.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Conventional methods of assembling thermoplastic composite articles and/or thermoplastic composite layups require a substantial degree of manual labor and/or human involvement in conjunction with performing various aspects, steps and/or stages of the assembly process. For example, human involvement in the cutting, picking up, placing, stacking, laying up and/or welding aspects of such conventional methods limits the accuracy and repeatability of the assembly process Multifunction end effector apparatus and methods disclosed herein advantageously reduce (e.g., eliminate) the need for human involvement in the cutting, picking up, placing, stacking, laying up and/or welding aspects of assembling thermoplastic composite articles. As a result of automating the assembly process and/or reducing the extent of human involvement in the assembly process, the disclosed multifunction end effector apparatus and methods improve both the accuracy and the repeatability of the assembly process.

Figure 1:
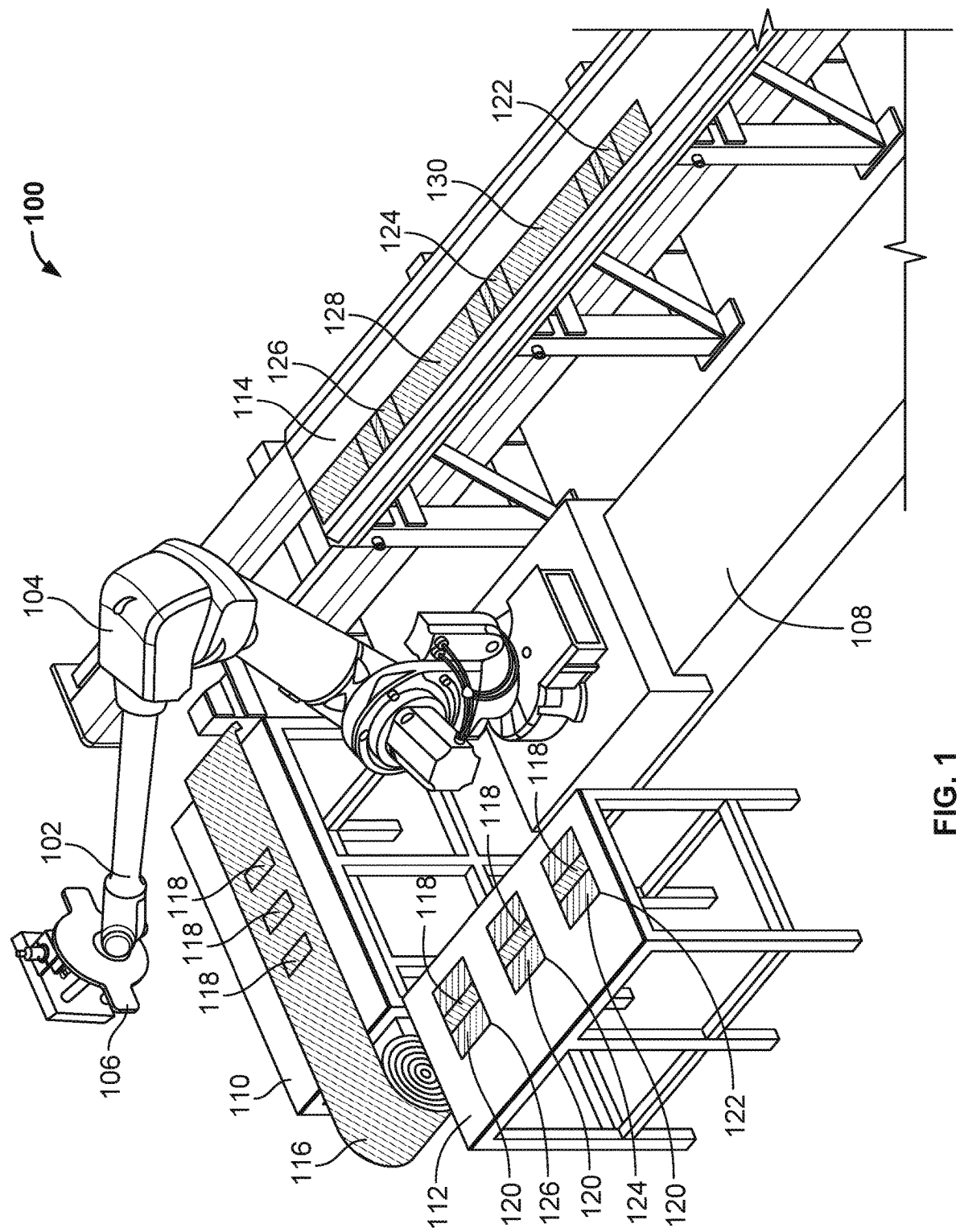
FIG. 1 illustrates an example environment of use in which an example multifunction end effector apparatus for assembling thermoplastic composite articles may be implemented in accordance with the teachings of this disclosure.

FIG. 1 illustrates an example environment of use 100 in which an example multifunction end effector apparatus 102 for assembling thermoplastic composite articles may be implemented in accordance with the teachings of this disclosure. As used herein, the term "thermoplastic composite article" refers generally to any thermoplastic article including at least two thermoplastic parts that have been welded to one another to form the thermoplastic article. Examples of thermoplastic composite articles include thermoplastic sub-assemblies as well as finished (e.g., fully-assembled) thermoplastic composite articles.

The multifunction end effector apparatus 102 of FIG. 1 includes an example robot 104 and an example end effector 106 coupled to the robot 104. In the illustrated example of FIG. 1, the robot 104 is a jointed arm six-axis robot capable of moving (e.g., translating, rotating, etc.) the end effector 106 of FIG. 1 into various positions and/or locations within the environment of use 100. In addition to the six degrees of freedom associated with the six axes of the robot 104, the robot 104 of FIG. 1 is also movable (e.g., slidable) along an example rail 108 of FIG. 1. Movement of the robot 104 along the rail 108 further improves (e.g., increases) the range of motion of the robot 104 within the environment of use 100 of FIG. 1. In other examples, the robot 104 of FIG. 1 may be of a different type, structure and/or configuration capable of moving the end effector 106 of FIG. 1 into various positions and/or locations within the environment of use 100.

The end effector 106 of FIG. 1 includes a plurality of functional heads to respectively perform one or more function(s), operation(s) and/or process(es) associated with assembling one or more thermoplastic composite articles. For example, the end effector 106 of FIG. 1 may include a cutting head having an ultrasonic cutter (e.g., an ultrasonic knife) to cut one or more thermoplastic part(s) from thermoplastic material (e.g., thermoplastic stock). As another example, the end effector 106 of FIG. 1 may additionally include a vacuum head having a vacuum surface to selectively pick up one or more thermoplastic part(s) in response to one or more vacuum force(s) applied at the vacuum surface. As another example, the end effector 106 of FIG. 1 may additionally include a welding head having an ultrasonic welder (e.g., an ultrasonic tack welder) to weld one thermoplastic part to another thermoplastic part to form a thermoplastic sub-assembly and/or a finished (e.g., fully-assembled) thermoplastic composite article.

In the illustrated example of FIG. 1, the robot 104 is controlled and/or programmed to move one or more desired functional head(s) (e.g., the cutting head, the vacuum head and/or the welding head) of the end effector 106 into contact with one or more thermoplastic workpieces in conjunction with assembling a thermoplastic composite article. In some examples, the thermoplastic workpiece is a sheet and/or ply of thermoplastic material (e.g., thermoplastic stock) from which one or more thermoplastic part(s) is/are to be cut. In some examples, the thermoplastic workpiece includes multiple sheets and/or plies (e.g., stacked sheets and/or plies) of thermoplastic material from which one or more thermoplastic part(s) is/are to be cut. In some examples, the thermoplastic workpiece is a thermoplastic part to be incorporated into a thermoplastic sub-assembly and/or into a finished thermoplastic composite article. In some examples, the thermoplastic workpiece is a thermoplastic sub-assembly to be incorporated into a finished thermoplastic composite article.

For example, the environment of use 100 of FIG. 1 includes an example material presentation table 110, an example sub-assembly table 112, and an example finished composite article table 114. In the illustrated example of FIG. 1, an example thermoplastic material 116 (e.g., a roll of thermoplastic stock) is presented at the material presentation table 110. In some examples, the thermoplastic material 116 may be a single sheet and/or ply. In other examples, the thermoplastic material 116 may include multiple sheets and/or plies arranged in a stacked configuration. The robot 104 may move the cutting head of the end effector 106 into contact with the sheet(s) and/or pl(ies) of thermoplastic material 116, and may further direct and/or cause the cutting head to cut one or more example thermoplastic part(s) 118 from the sheet(s) and/or pl(ies) of thermoplastic material 116. In some examples, a vacuum bed (not shown in FIG. 1) may be positioned on and/or integrated within the material presentation table 110 to hold the thermoplastic material 116 in place while the thermoplastic material 116 is cut by the cutting head of the end effector 106. Examples of such vacuum beds are described in U.S. patent application Ser. No. 15/477,884 entitled "Vacuum Table with Individual Vacuum Chambers" filed on Apr. 3, 2017, the entirety of which is incorporated herein by reference.

After the thermoplastic material 116 of FIG. 1 has been cut by the cutting head of the end effector 106, the robot 104 may subsequently move the vacuum head of the end effector 106 into contact with one or more of the thermoplastic parts 118 located at the material presentation table 110 of FIG. 1, and may further direct and/or cause the vacuum head to pick up one or more of the thermoplastic parts 118 from the material presentation table 110. In some examples, the vacuum head may selectively pick up a desired number of thermoplastic parts (e.g., one thermoplastic part, two thermoplastic parts, etc.) from among a stack of thermoplastic parts (e.g., a stack of two or more thermoplastic parts), such as when the thermoplastic material 116 includes multiple sheets and/or plies arranged in a stacked configuration. While the vacuum head of the end effector 106 is holding the one or more thermoplastic part(s) 118, the robot 104 may subsequently move the vacuum head and/or, more generally, the end effector 106 from the material presentation table 110 of FIG. 1 to the sub-assembly table 112 of FIG. 1, and may further direct and/or cause the vacuum head to position respective ones of the one or more thermoplastic part(s) 118 at one or more location(s) on the sub-assembly table 112. In some examples, the robot 104 may direct and/or cause the vacuum head to position respective ones of the one or more thermoplastic part(s) 118 onto one or more other example thermoplastic part(s) 120 already positioned on the sub-assembly table 112 of FIG. 1.

After the one or more thermoplastic part(s) 118 have been positioned at the sub-assembly table 112 of FIG. 1 by the vacuum head of the end effector 106, the robot 104 may subsequently move the welding head of the end effector 106 into contact with a first one of the thermoplastic part(s) 118, and may further direct and/or cause the welding head to weld the first thermoplastic part (e.g., the first one of the thermoplastic part(s) 118) to a second thermoplastic part (e.g., a first one of the other thermoplastic part(s) 120) to form a thermoplastic sub-assembly. In some examples, a vacuum bed (not shown in FIG. 1) as described above may be positioned on and/or integrated within the sub-assembly table 112 to hold the first thermoplastic part and/or the second thermoplastic part in place while the first thermoplastic part is welded to the second thermoplastic part by the welding head of the end effector 106.

Multiple thermoplastic sub-assemblies respectively having any number of thermoplastic parts may be formed at the sub-assembly table 112. For example, as shown in FIG. 1, a first example thermoplastic sub-assembly 122, a second example thermoplastic sub-assembly 124, and a third example thermoplastic sub-assembly 126 have been formed at the sub-assembly table 112. In some examples, one or more of the thermoplastic sub-assemblies formed at the sub-assembly table 112 of FIG. 1 may constitute a finished thermoplastic composite article. In other examples, one or more of the thermoplastic sub-assemblies formed at the sub-assembly table 112 of FIG. 1 may subsequently be joined (e.g., welded) to another thermoplastic part and/or another thermoplastic sub-assembly to form a finished thermoplastic composite article.

For example, following the formation of the first thermoplastic sub-assembly 122 at the sub-assembly table 112 of FIG. 1 as described above, the robot 104 of FIG. 1 may subsequently move the vacuum head of the end effector 106 into contact with the first thermoplastic sub-assembly 122 located at the sub-assembly table 112, and may further direct and/or cause the vacuum head to pick up the first thermoplastic sub-assembly 122 from the sub-assembly table 112. While the vacuum head of the end effector 106 is holding the first thermoplastic sub-assembly 122, the robot 104 may move the vacuum head and/or, more generally, the end effector 106 from the sub-assembly table 112 of FIG. 1 to the finished composite article table 114 of FIG. 1, and may further direct and/or cause the vacuum head to position the first thermoplastic sub-assembly 122 at a location on the finished composite article table 114. In some examples, the robot 104 may direct and/or cause the vacuum head to position the first thermoplastic sub-assembly 122 onto another example thermoplastic part 128 already positioned on the finished composite article table 114 of FIG. 1.

After the first thermoplastic sub-assembly 122 has been positioned at the finished composite article table 114 of FIG. 1 by the vacuum head of the end effector 106, the robot 104 may subsequently move the welding head of the end effector 106 into contact with the first thermoplastic sub-assembly 122, and may further direct and/or cause the welding head to weld the first thermoplastic sub-assembly 122 to the other thermoplastic part 128. As shown in FIG. 1, multiple thermoplastic sub-assemblies (e.g., the first thermoplastic sub-assembly 122 and the second thermoplastic sub-assembly 124) may be welded to the other thermoplastic part 128 to form an example finished thermoplastic composite article 130 of FIG. 1.

The multifunction end effector apparatus 102 of FIG. 1 may perform the above-described cutting, picking up, moving, placing, and welding function(s), operation(s) and/or process(es) in any order and/or sequence in the course of assembling one or more thermoplastic composite article(s). Furthermore, the environment of use 100 of FIG. 1 in which the multifunction end effector apparatus 102 operates may include additional, fewer and/or different types of tables relative to the material presentation table 110, the sub-assembly table 112 and/or the finished composite article table 114 of FIG. 1 described above.

Figure 2:
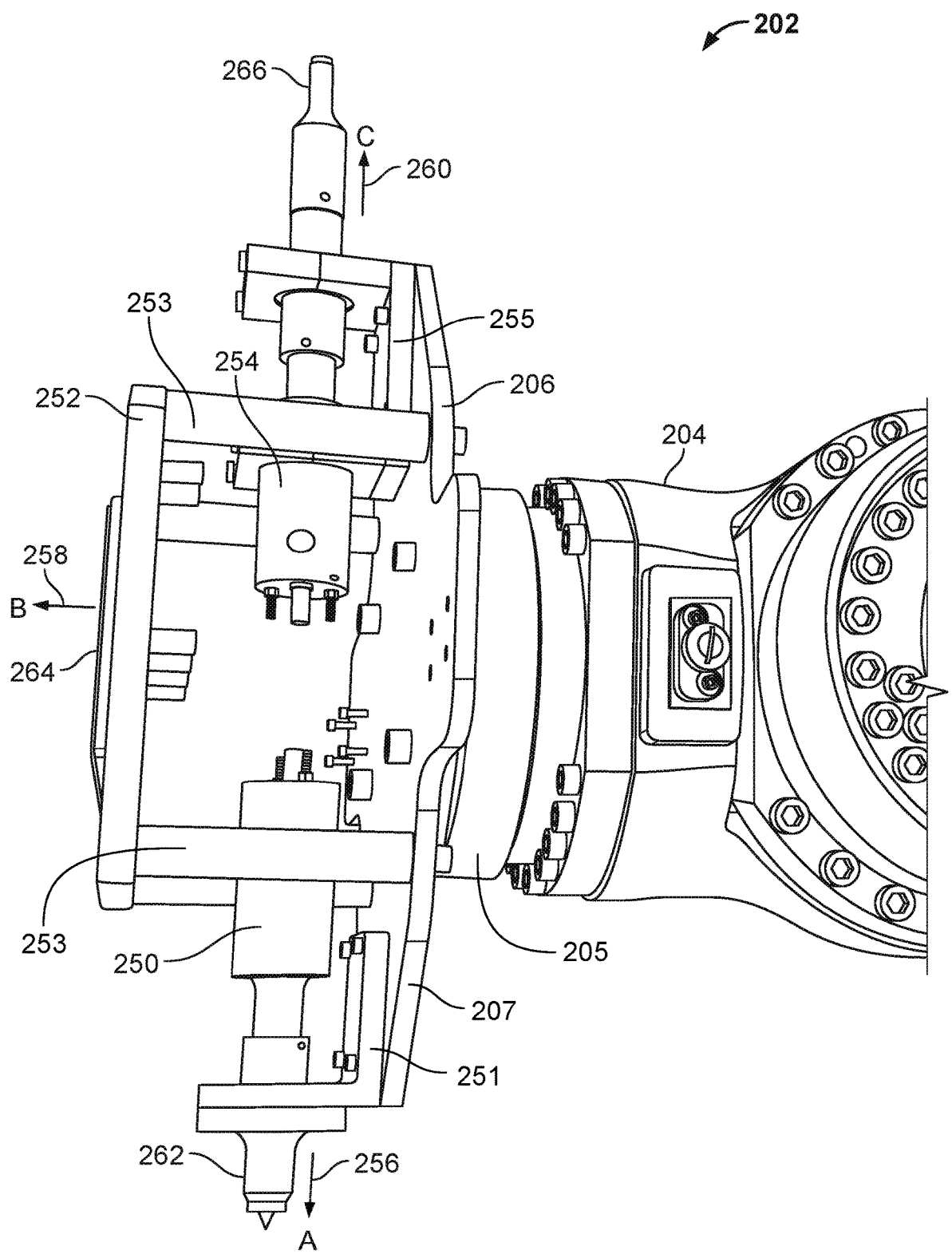
FIG. 2 is a perspective view of an example multifunction end effector apparatus for assembling thermoplastic composite articles.
Figure 3:
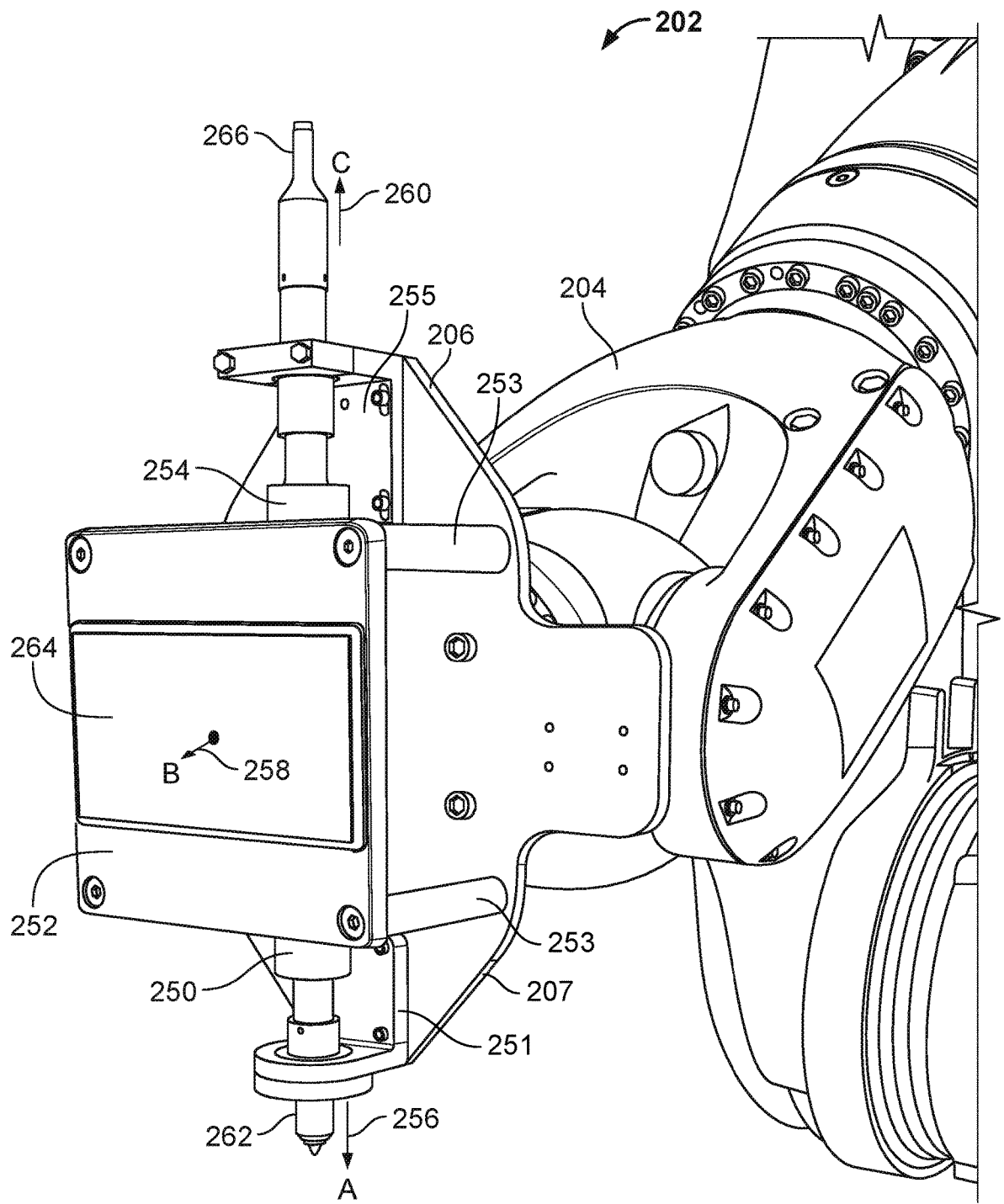
FIG. 3 is another perspective view of the example multifunction end effector apparatus of FIG. 2.

FIG. 2 is a perspective view of an example multifunction end effector apparatus 202 for assembling thermoplastic composite articles. FIG. 3 is another perspective view of the example multifunction end effector apparatus 202 of FIG. 2. The example multifunction end effector apparatus 202 of FIGS. 2 and 3 may be implemented in an environment of use such as the example environment of use 100 of FIG. 1 described above.

The multifunction end effector apparatus 202 of FIGS. 2 and 3 includes an example robot 204 having an example rotatable wrist segment 205, and further includes an example end effector 206 having an example frame 207 rigidly coupled to the rotatable wrist segment 205 of the robot 204. In the illustrated example of FIGS. 2 and 3, the robot 204 is a jointed arm six-axis robot capable of moving (e.g., translating, rotating, etc.) the end effector 206 of FIGS. 2 and 3 into various positions and/or locations within an environment of use. In other examples, the robot 204 of FIGS. 2 and 3 may be of a different type, structure and/or configuration capable of moving the end effector 206 of FIGS. 2 and 3 into various positions and/or locations within an environment of use.

The end effector 206 of FIGS. 2 and 3 includes a plurality of functional heads to respectively perform one or more function(s), operation(s) and/or process(es) associated with assembling one or more thermoplastic composite articles. More specifically, the end effector 206 of FIGS. 2 and 3 includes an example cutting head 250 rigidly coupled to the frame 207 via an example mounting bracket 251, an example vacuum head 252 rigidly coupled to the frame 207 via example mounting arms 253, and an example welding head 254 rigidly coupled to the frame 207 via an example mounting bracket 255. In the illustrated example of FIGS. 2 and 3, the cutting head 250 is operatively positioned on the frame 207 of the end effector 206 in a first direction generally indicated by a first example directional arrow 256 referenced as directional arrow "A" in FIGS. 2 and 3. The vacuum head 252 is operatively positioned on the frame 207 of the end effector 206 in a second direction generally indicated by a second example directional arrow 258 referenced as directional arrow "B" in FIGS. 2 and 3. The welding head 254 is operatively positioned on the frame 207 of the end effector 206 in a third direction generally indicated by a third example directional arrow 260 referenced as directional arrow "C" in FIGS. 2 and 3. In the illustrated example of FIGS. 2 and 3, the first direction (e.g., directional arrow "A") at which the cutting head 250 is operatively positioned on the frame 207 of the end effector 206 is opposite the third direction (e.g., directional arrow "C") at which the welding head 254 is operatively positioned on the frame 207 of the end effector 206. Furthermore, the second direction (e.g., directional arrow "B") at which the vacuum head 252 is operatively positioned on the frame 207 of the end effector 206 is generally orthogonal to the first direction (e.g., directional arrow "A") at which the cutting head 250 is operatively positioned on the frame 207 of the end effector 206, as well as the third direction (e.g., directional arrow "C") at which the welding head 254 is operatively positioned on the frame 207 of the end effector 206.

In other examples, one or more of the cutting head 250, the vacuum head 252, and/or the welding head 254 may be operatively positioned on the frame 207 of the end effector 206 in a direction that differs from that shown in FIGS. 2 and 3. For example, the relative operative positioning of the cutting head 250 and the vacuum head 252 may be switched such that the vacuum head 252 is operatively positioned in the first direction generally indicated by the first directional arrow 256 referenced as directional arrow "A" in FIGS. 2 and 3, and the cutting head 250 is operatively positioned in the second direction generally indicated by the second directional arrow 258 referenced as directional arrow "B" in FIGS. 2 and 3. When operatively positioned on the frame 207 of the end effector 206 in the second direction (e.g., directional arrow "B"), the cutting head 250 may be in line with, and/or rotatable about, an axis of rotation of the rotatable wrist segment 205 of the robot 204 to which the end effector 206 is rigidly coupled. In such a configuration, the rotatable wrist segment 205 of the robot 204 may function as a rotary positioner to guide the cutting head 250.

The cutting head 250 of the end effector 206 of FIGS. 2 and 3 includes an example ultrasonic cutter 262 (e.g., an ultrasonic knife) to cut one or more thermoplastic part(s). The ultrasonic cutter 262 and/or, more generally, the cutting head 250 may be powered, controlled and/or operated by an ultrasonic power supply (not shown in FIGS. 2 and 3). In some examples, the ultrasonic power supply may be mounted to and/or on the end effector 206 and/or the robot 204 of the multifunction end effector apparatus 202 of FIGS. 2 and 3. In other examples, the ultrasonic power supply may be positioned at a remote location relative to the end effector 206 and/or the robot 204 of the multifunction end effector apparatus 202. Regardless of its location, the ultrasonic power supply is operatively coupled to the ultrasonic cutter 262 of the cutting head 250 to enable the ultrasonic cutter 262 to cut one or more thermoplastic part(s). In some examples, the ultrasonic power supply is adjustable such that the ultrasonic cutter 262 may operate at different (e.g., adjustable) power settings depending upon material and/or specification requirements associated with the cutting operation to be performed. The cutting, head 250 of the end effector 206 of FIGS. 2 and 3 is further described below in connection with FIG. 6.

Figure 4:
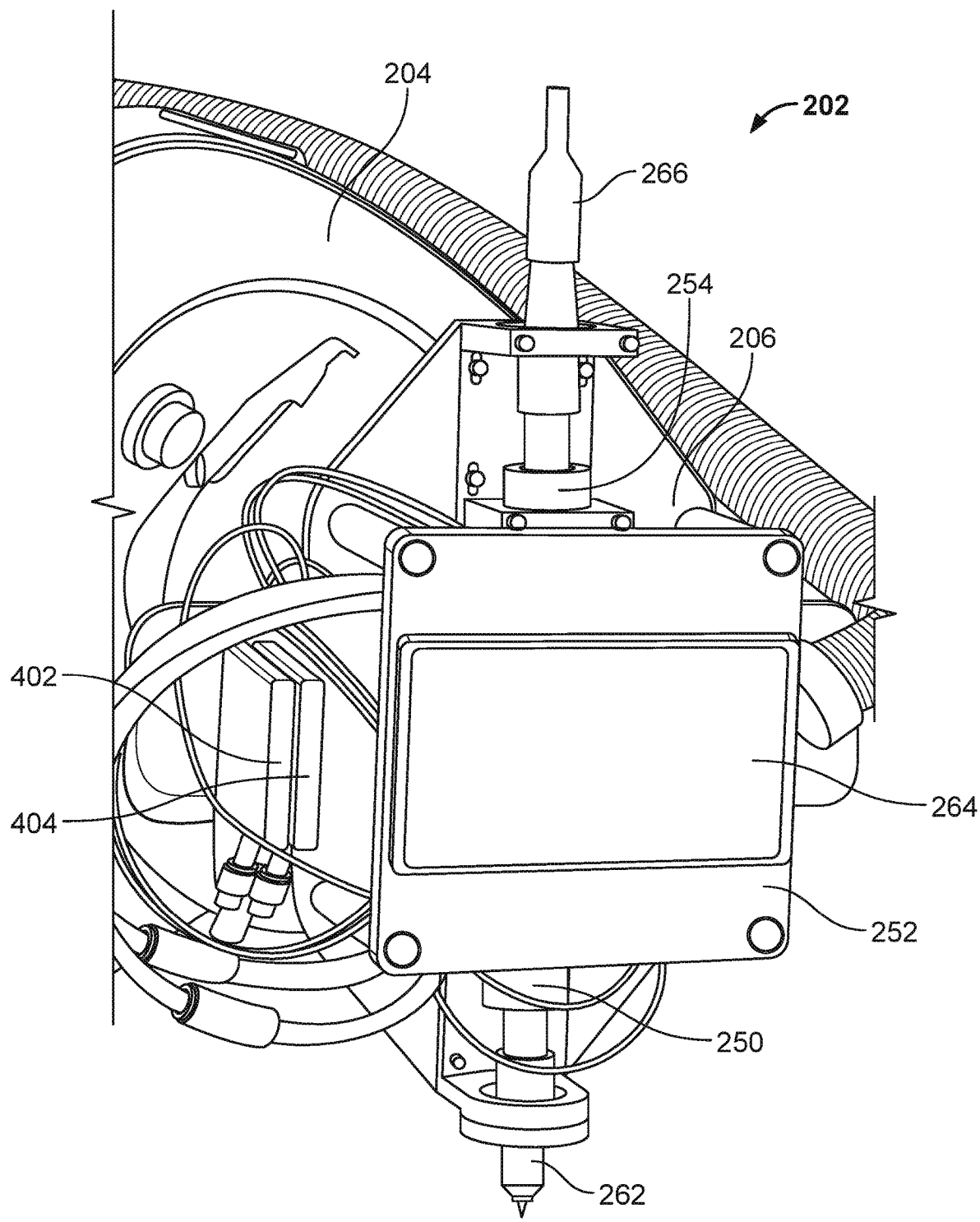
FIG. 4 is a perspective view of the example multifunction end effector apparatus of FIGS. 2 and 3 further including a first example vacuum generator and a second example vacuum generator operatively coupled to the example vacuum head of FIGS. 2 and 3.
Figure 5:
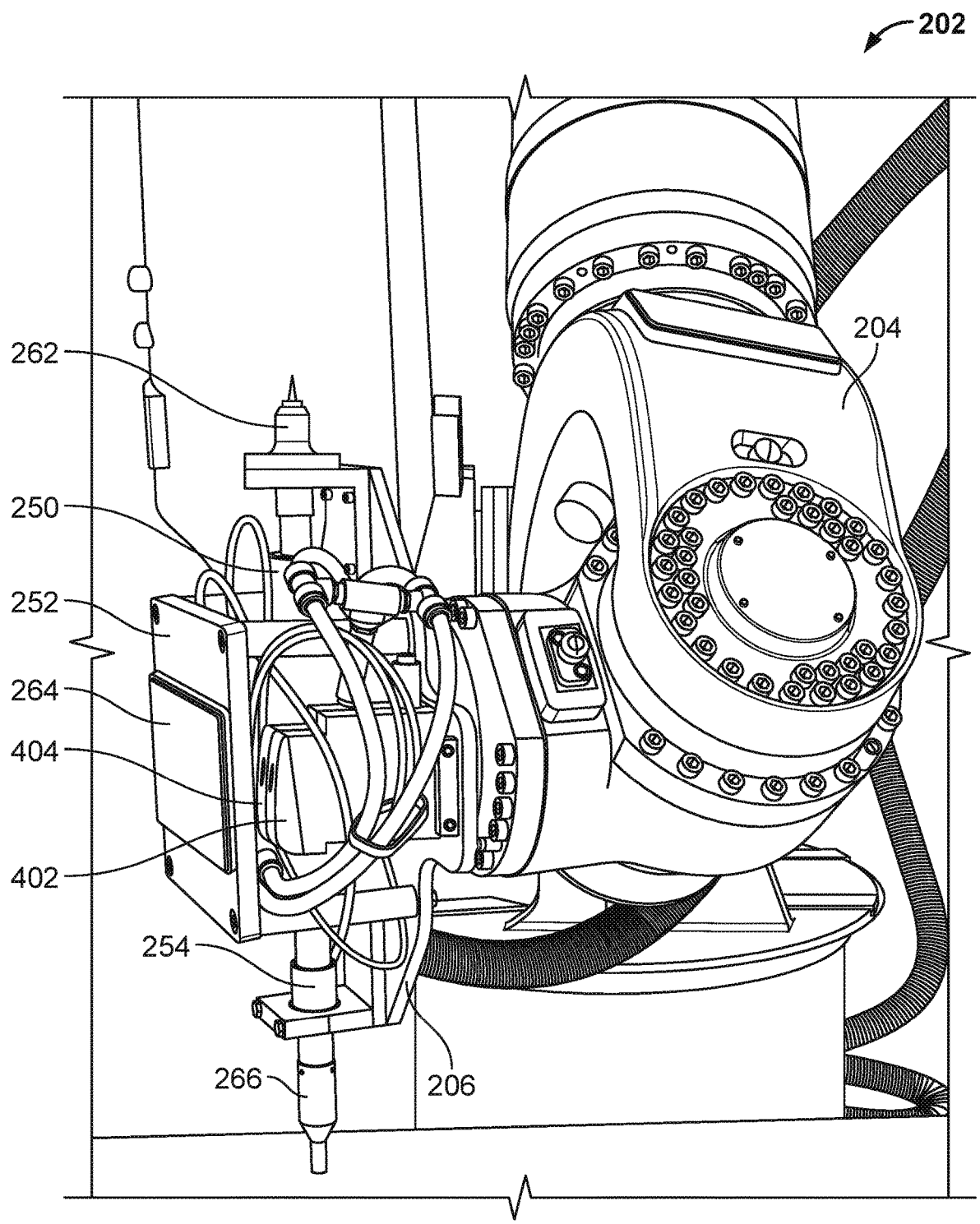
FIG. 5 is another perspective view of the example multifunction end effector apparatus of FIGS. 2 and 3 further including the first example vacuum generator and the second example vacuum generator of FIG. 4.

The vacuum head 252 of the end effector 206 of FIGS. 2 and 3 includes an example vacuum surface 264 to selectively pick up and/or hold one or more thermoplastic part(s) in response to one or more controlled vacuum force(s) applied at the vacuum surface 264. In some examples, the vacuum surface 264 is formed from a sintered porous plastic material through which one or more vacuum force(s) may pass. The vacuum force(s) to be applied at the vacuum surface 264 of the vacuum head 252 may be generated and/or controlled by one or more vacuum generator(s) (not shown in FIGS. 2 and 3). In some examples, the one or more vacuum generator(s) may be mounted to and/or on the end effector 206 and/or the robot 204 of the multifunction end effector apparatus 202 of FIGS. 2 and 3. For example, FIG. 4 is a perspective view of the example multifunction end effector apparatus 202 of FIGS. 2 and 3 further including a first example vacuum generator 402 and a second example vacuum generator 404 operatively coupled to the example vacuum head 252 of FIGS. 2 and 3. FIG. 5 is another perspective view of the example multifunction end effector apparatus 202 of FIGS. 2 and 3 further including the first example vacuum generator 402 and the second example vacuum generator 404 of FIG. 4. In the illustrated example of FIGS. 4 and 5, the first and second vacuum generators 402, 404 are mounted to and/or on the end effector 206 of the multifunction end effector apparatus 202.

In other examples, the vacuum generator(s) may be positioned at a remote location relative to the end effector 206 and/or the robot 204 of the multifunction end effector apparatus 202. Regardless of its/their respective location(s), the vacuum generator(s) is/are operatively coupled to the vacuum head 252 to enable the vacuum surface 264 of the vacuum head 252 to selectively pick up and/or hold one or more thermoplastic part(s) in response to one or more vacuum force(s) applied at the vacuum surface 264. In some examples, the vacuum force(s) generated by the vacuum generator(s) of the vacuum head 252 is/are controllable and/or adjustable to enable the vacuum surface 264 of the vacuum head 252 to selectively pick up a desired number of thermoplastic parts (e.g., one thermoplastic part, two thermoplastic parts, etc.) from among a stack (e.g., multiple plies) of thermoplastic parts. For example, a relatively greater vacuum force generated by the vacuum generator(s) may result in the vacuum surface 264 of the vacuum head 252 picking up a greater number of thermoplastic parts (e.g., two plies and/or two stacked thermoplastic parts) from within a stack of thermoplastic parts, while a relatively lower vacuum force generated by the vacuum generator(s) may result in the vacuum surface 264 of the vacuum head 252 picking up a lesser number of thermoplastic parts (e.g., a single ply and/or a single part) from within the stack of thermoplastic parts.

In some examples, the vacuum head 252 includes a plurality of vacuum regions (not shown in FIGS. 2 and 3) arranged and/or positioned along the vacuum surface 264 of the vacuum head 252 to which one or more vacuum force(s) may selectively be applied. Selective application of one or more vacuum force(s) at one or more corresponding vacuum region(s) along the vacuum surface 264 enables one or more desired portion(s) and/or area(s) of the vacuum surface 264 to pick up and/or hold one or more thermoplastic part(s). Respective ones of the vacuum regions may be individually controlled, thereby allowing for individual thermoplastic parts of various sizes and/or multiple thermoplastic parts to be selectively picked up via the vacuum surface 264 of the vacuum head 252. An example vacuum head having selectively operable vacuum regions arranged along a vacuum surface of the vacuum head is further described below in connection with FIGS. 9 and 10.

In some examples, the vacuum head 252 of FIGS. 2 and 3 is to hold one or more thermoplastic part(s) in place relative to the vacuum surface 264 while the one or more thermoplastic part(s) is/are moved from a first location to a second location. In some examples, the vacuum head 252 of FIGS. 2 and 3 may include one or more vacuum-controlled suction cup(s) arranged on the vacuum head 252. In some examples, the vacuum-controlled suction cup(s) may be arranged along the vacuum surface 264 of the vacuum head 252. In some examples, the vacuum-controlled suction cup(s) may themselves form and/or be the vacuum surface 264 of the vacuum head 252. In some examples, the vacuum-controlled suction cup(s) may be laterally offset from the vacuum surface 264 of the vacuum head 252 such that the vacuum-controlled suction cup(s) contact one or more portion(s) of a thermoplastic part of a size that is greater than the size of the vacuum surface 264 of the vacuum head 252. The vacuum-controlled suction cup(s) may assist the vacuum head 252 in holding the one or more thermoplastic part(s) in place relative to the vacuum surface 264 while the one or more thermoplastic part(s) is/are moved from the first location to the second location. In some examples, the vacuum head 252 is to place a first thermoplastic part into contact with a second thermoplastic part at the second location. In some examples, the vacuum head 252 is to hold the first thermoplastic part in place relative to the second thermoplastic part at the second location. The vacuum head 252 of the end effector 206 of FIGS. 2 and 3 is further described below in connection with FIG. 7.

The welding head 254 of the end effector 206 of FIGS. 2 and 3 includes an example ultrasonic welder 266 (e.g., an ultrasonic tack welder) to weld one thermoplastic part to another thermoplastic part to form a thermoplastic composite article. The ultrasonic welder 266 and/or, more generally, the welding head 254 may be powered, controlled and/or operated by an ultrasonic power supply (not shown in FIGS. 2 and 3). In some examples, the ultrasonic power supply that powers, controls and/or operates the ultrasonic welder 266 and/or welding head 254 may be the same ultrasonic power supply that powers, controls and/or operates the ultrasonic cutter 262 and/or cutting head 250, as described above. In some examples, the ultrasonic power supply may be mounted to and/or on the end effector 206 and/or the robot 204 of the multifunction end effector apparatus 202 of FIGS. 2 and 3. In other examples, the ultrasonic power supply may be positioned at a remote location relative to the end effector 206 and/or the robot 204 of the multifunction end effector apparatus 202. Regardless of its location, the ultrasonic power supply is operatively coupled to the ultrasonic welder 266 of the welding head 254 to enable the ultrasonic welder 266 to weld one thermoplastic part to another thermoplastic part. In some examples, the ultrasonic power supply is adjustable such that the ultrasonic welder 266 may operate at different (e.g., adjustable) power settings depending upon material and/or specification requirements associated with the welding operation to be performed.

In some examples, the ultrasonic welder 266 of the welding head 254 is movable relative to the frame 207 of the end effector 206. For example, the ultrasonic welder 266 may be movable along the third direction generally indicated by the third example directional arrow 260 referenced as directional arrow "C" in FIGS. 2 and 3. In some examples, the ultrasonic welder 266 may be coupled to the welding head 254 in a spring-loaded manner that causes movement of the ultrasonic welder 266 relative to the welding head 254 and/or, more generally, relative to the frame 207 of the end effector 206. In other examples, the ultrasonic welder 266 may be coupled to an air cylinder that causes movement of the ultrasonic welder 266 relative to the welding head 254 and/or, more generally, relative to the frame 207 of the end effector 206. In some examples, movement of the ultrasonic welder 266 enables the force at which the ultrasonic welder 266 operates (e.g., the force at which the ultrasonic welder 266 welds a first thermoplastic part to a second thermoplastic part) to be adjustable depending upon material and/or specification requirements associated with the welding operation to be performed. The welding head 254 of the end effector 206 of FIGS. 2 and 3 is further described below in connection with FIG. 8.

In the illustrated example of FIGS. 2 and 3, the robot 204 is controllable and/or programmable to move any one of the ultrasonic cutter 262 of the cutting head 250, the vacuum surface 264 of the vacuum head 252, or the ultrasonic welder 266 of the welding head 254 into contact with one or more thermoplastic workpieces at any given time in conjunction with assembling a thermoplastic composite article. In some examples, the thermoplastic workpiece is a sheet and/or ply (or stacked sheets and/or plies) of thermoplastic material from which one or more thermoplastic part(s) is/are to be cut. In some examples, the thermoplastic workpiece is a thermoplastic part to be incorporated into a thermoplastic sub-assembly and/or into a finished thermoplastic composite article. In some examples, the thermoplastic workpiece is a thermoplastic sub-assembly to be incorporated into a finished thermoplastic composite article.

Figure 6:
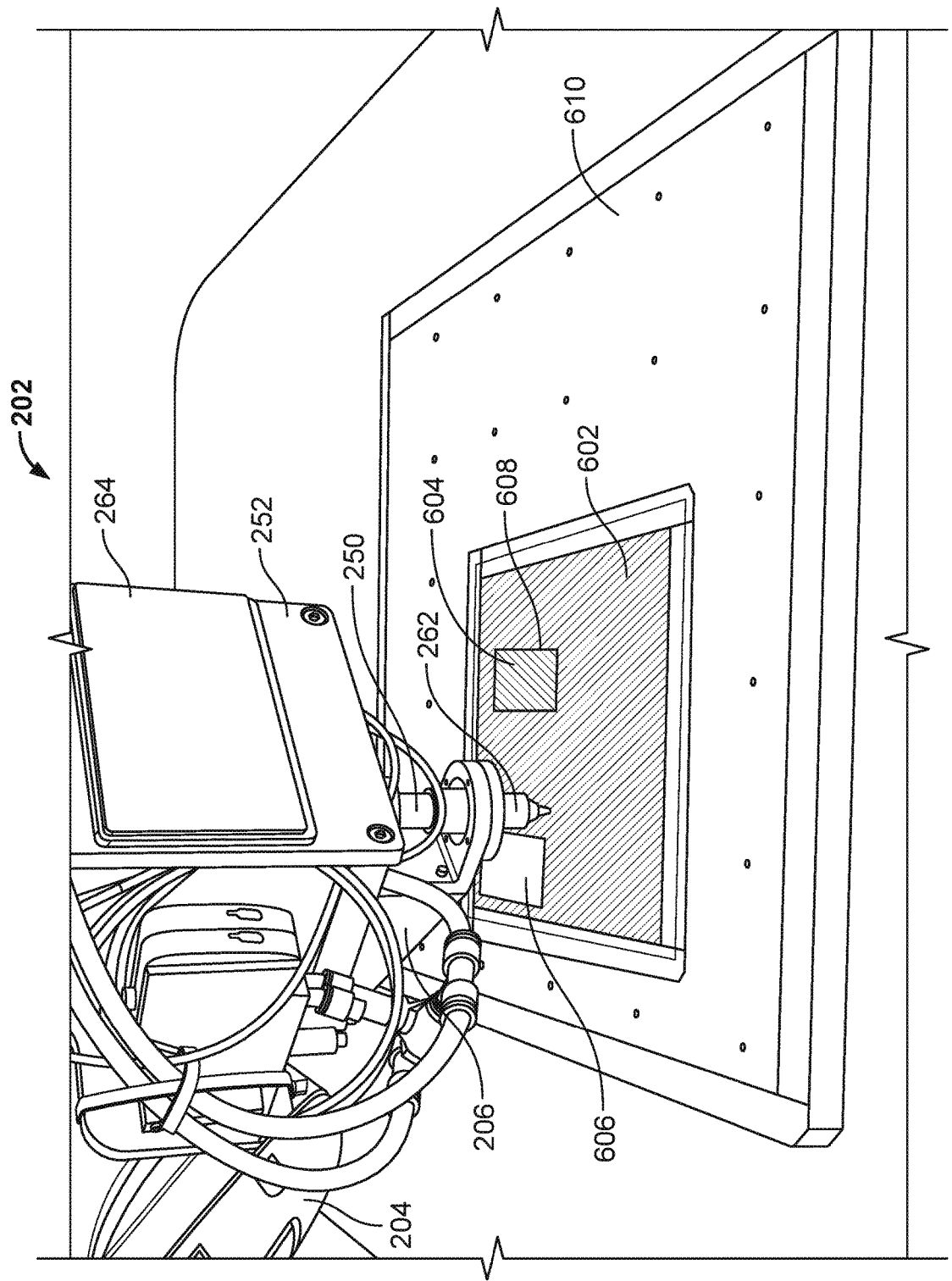
FIG. 6 is a perspective view of the example cutting head of the example multifunction end effector apparatus of FIGS. 2-5 cutting a first example thermoplastic material to form one or more thermoplastic part(s).

FIG. 6 is a perspective view of the example cutting head 250 of the example multifunction end effector apparatus 202 of FIGS. 2-5 cutting a first example thermoplastic material 602 via the ultrasonic cutter 262 of the cutting head 250 to form one or more thermoplastic part(s). In the illustrated example of FIG. 6, the thermoplastic material 602 is a single sheet and/or ply. In other examples, the thermoplastic material 602 may include multiple sheets and/or plies arranged in a stacked configuration. In the illustrated example of FIG. 6, the ultrasonic cutter 262 of the cutting head 250 has already cut a first example thermoplastic part 604 from a first example area 606 of the thermoplastic material 602. The first thermoplastic part 604 has been moved (e.g., via the vacuum head 252 of the multifunction end effector apparatus 202) from the first area 606 to a second example area 608 located on top of the thermoplastic material 602. In the illustrated example of FIG. 6, an example vacuum bed 610 holds the thermoplastic material 602 in place while the thermoplastic material 602 is cut by the ultrasonic cutter 262 of the cutting head 250.

Figure 7:
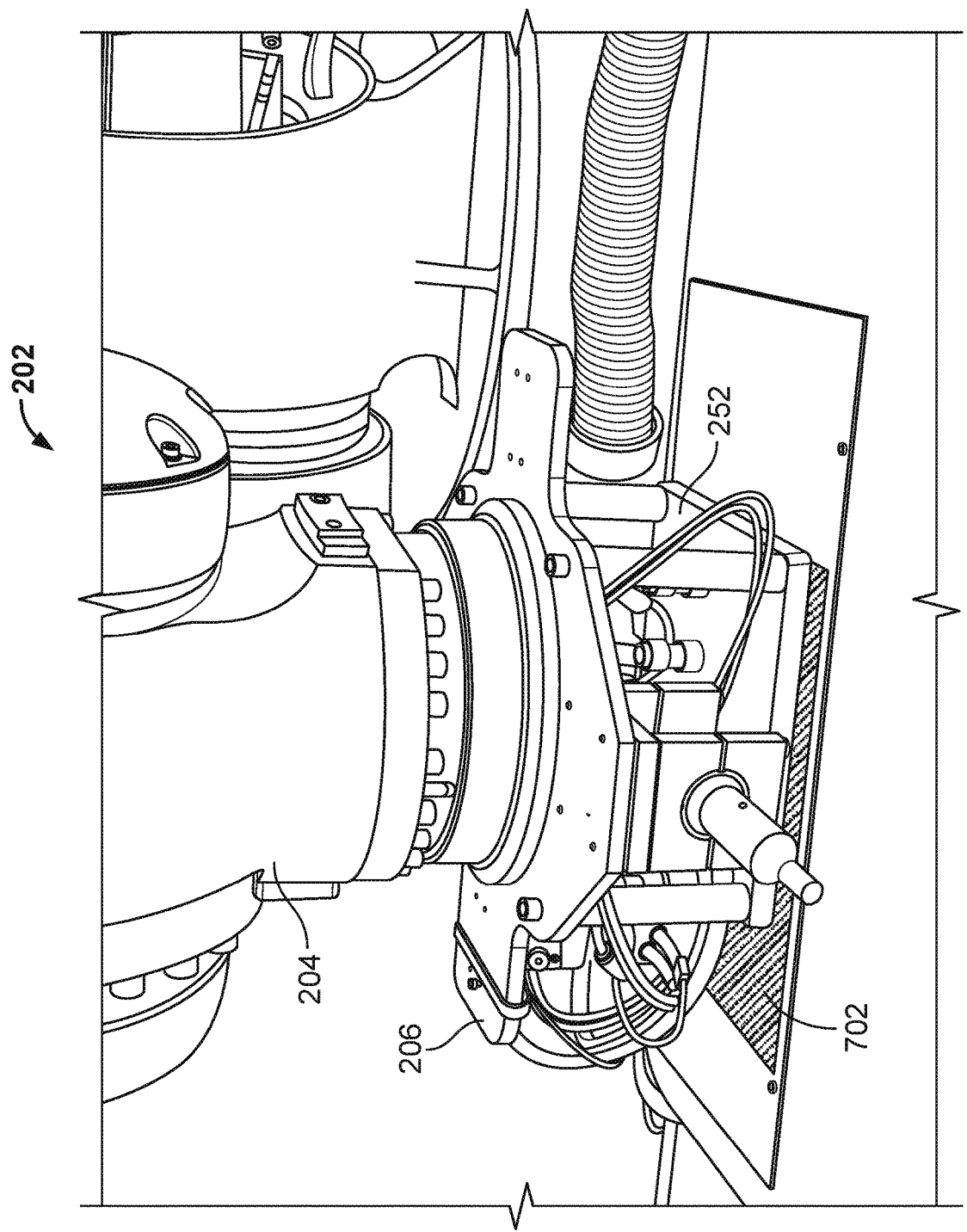
FIG. 7 is a perspective view of the example vacuum head of the example multifunction end effector apparatus of FIGS. 2-6 placing a first thermoplastic part in contact with a second example thermoplastic part.

FIG. 7 is a perspective view of the example vacuum head 252 of the example multifunction end effector apparatus 202 of FIGS. 2-6 placing a first thermoplastic part (not shown in FIG. 7) in contact with a second example thermoplastic part 702 via the vacuum surface 264 (not shown in FIG. 7) of the vacuum head 252. The first thermoplastic part may be any thermoplastic part cut by the cutting head 250 of the multifunction end effector apparatus 202 of FIGS. 2-6 including, for example, the first thermoplastic part 604 of FIG. 6 described above. During the placement operation and/or process illustrated in FIG. 7, the vacuum surface 264 of the vacuum head 252 is in contact with the first thermoplastic part. For example, the vacuum surface 264 may pick up and/or hold the first thermoplastic part in response to a vacuum force applied at the vacuum surface 264. The vacuum head 252 holds the first thermoplastic part in place relative to the vacuum surface 264 until the first thermoplastic part has been moved to a desired location (e.g., a specified location in contact with the second thermoplastic part 702 of FIG. 7). After the first thermoplastic part has been moved to the desired location, the vacuum force applied at the vacuum surface 264 may be reduced (e.g., minimized and/or discontinued), thereby resulting in the vacuum head 252 placing the first thermoplastic part relative to the second thermoplastic part 702. In some examples, the vacuum head 252 may hold the first thermoplastic part in place relative to the second thermoplastic part.

Figure 8:
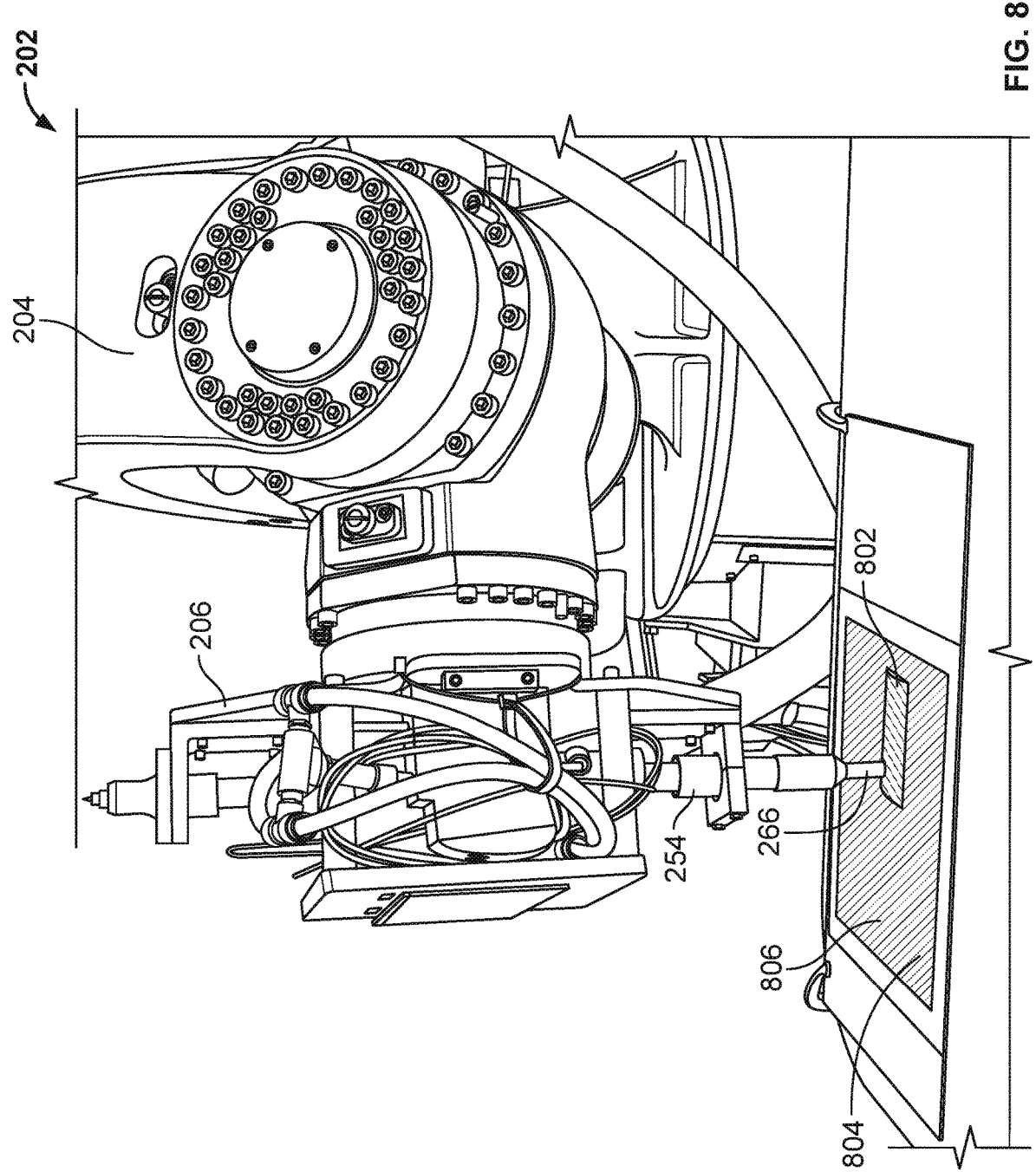
FIG. 8 is a perspective view of the example welding head of the example multifunction end effector apparatus of FIGS. 2-7 welding a first example thermoplastic part to a second example thermoplastic part to form an example thermoplastic composite article.

FIG. 8 is a perspective view of the example welding head 254 of the example multifunction end effector apparatus 202 of FIGS. 2-7 welding a first example thermoplastic part 802 to a second example thermoplastic part 804 via the ultrasonic welder 266 of the welding head 254 to form an example thermoplastic composite article 806. The first thermoplastic part 802 of FIG. 8 may be any thermoplastic part cut by the cutting head 250 and/or placed by the vacuum head 252 of the multifunction end effector apparatus 202 of FIGS. 2-7 including, for example, the first thermoplastic part 604 of FIG. 6 described above. The second thermoplastic part 804 of FIG. 8 may be any thermoplastic part including, for example, the second thermoplastic part 702 of FIG. 7 described above. In some examples, the thermoplastic composite article 806 of FIG. 8 may be a thermoplastic subassembly. In other examples, the thermoplastic composite article 806 of FIG. 8 may be a finished (e.g., fully-assembled) thermoplastic composite article.

Figure 9:
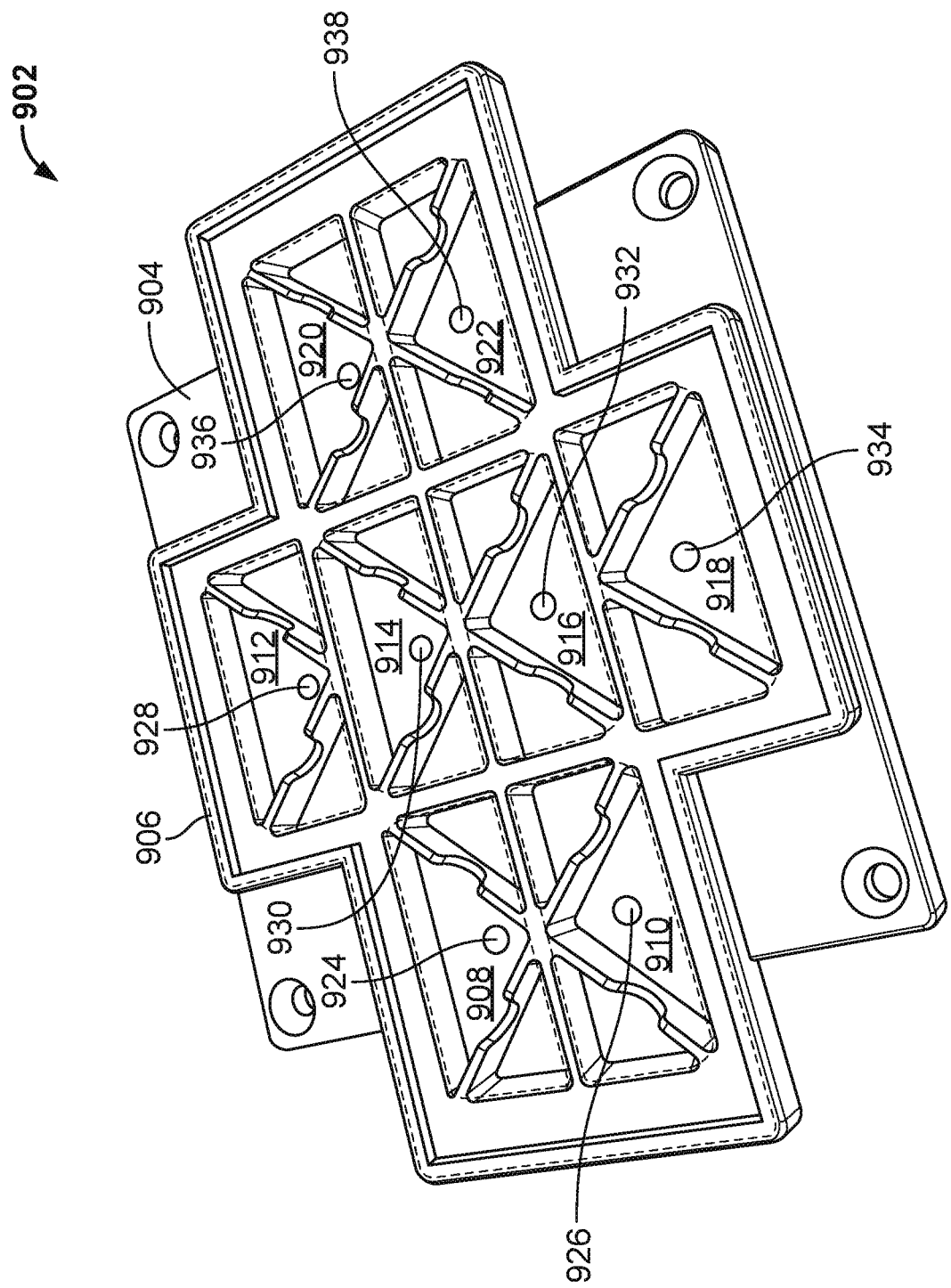
FIG. 9 is a perspective view of a first side of an example vacuum head that may be implemented as part of the example multifunction end effector apparatus of FIGS. 2-8.
Figure 10:
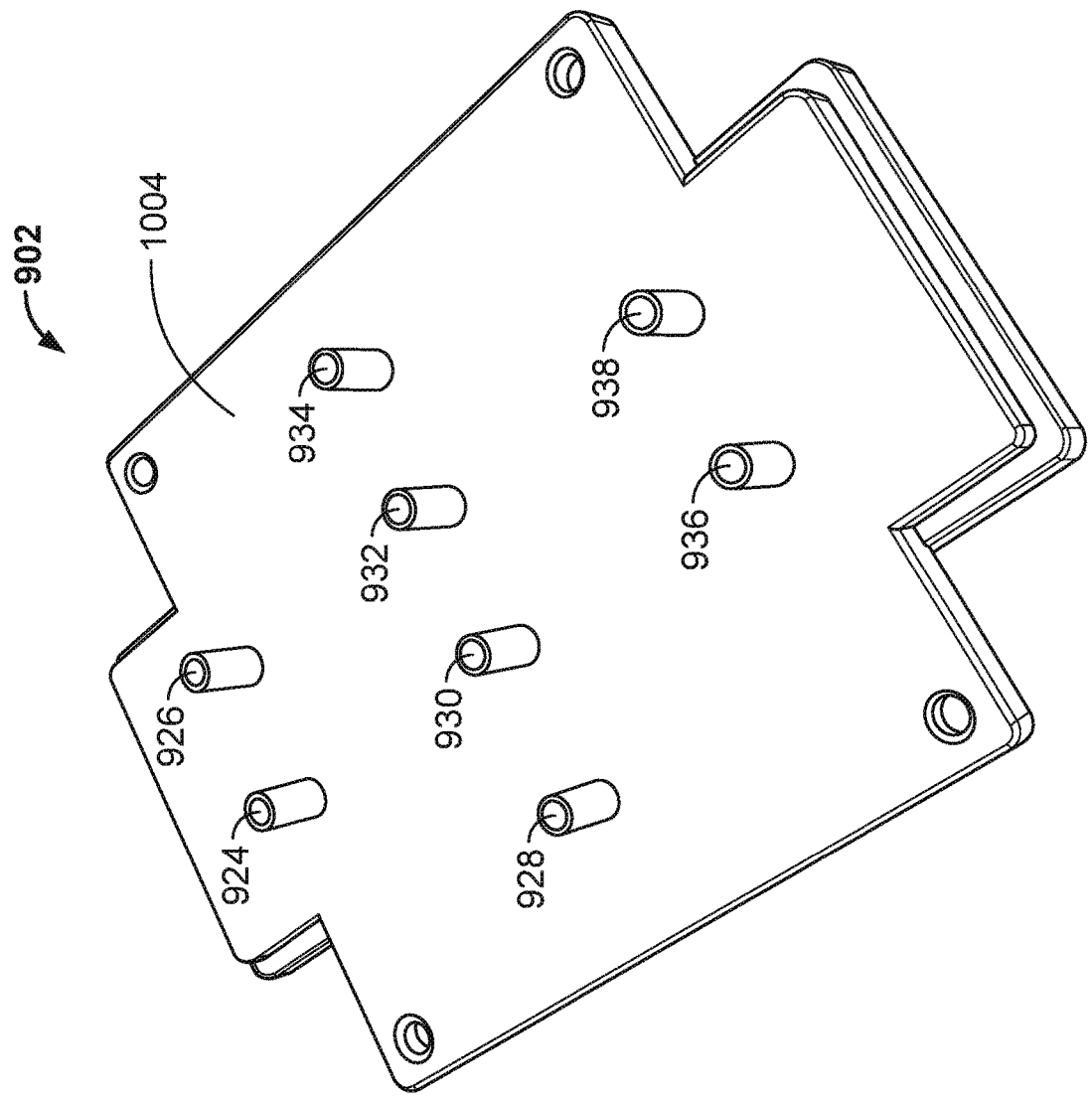
FIG. 10 is a perspective view of a second side of the example vacuum head of FIG. 9.

FIG. 9 is a perspective view of a first side (e.g., a front side) of an example vacuum head 902 that may be implemented as part of the example multifunction end effector apparatus of FIGS. 2-8. FIG. 10 is a perspective view of a second side (e.g., a rear side) of the example vacuum head 902 of FIG. 9. In the illustrated example of FIGS. 9 and 10, an example front side 904 of the vacuum head 902 includes an example vacuum area 906 configured to enable a vacuum surface (e.g., a sintered porous plastic surface such as the vacuum surface 264 of FIGS. 2-8) placed over the vacuum area 906 to selectively pick up and/or hold one or more thermoplastic part(s) in response to one or more controlled vacuum force(s) applied at the vacuum surface via one or more segmented regions and/or zones within the vacuum area 906. The vacuum force(s) to be applied at the vacuum surface of the vacuum head 902 may be generated and/or controlled by one or more vacuum generator(s) (not shown in FIGS. 9 and 10).

In the illustrated example of FIGS. 9 and 10, the vacuum area 906 of the vacuum head 902 includes a first example vacuum region 908, a second example vacuum region 910, a third example vacuum region 912, a fourth example vacuum region 914, a fifth example vacuum region 916, a sixth example vacuum region 918, a seventh example vacuum region 920, and an eighth example vacuum region 922 arranged and/or positioned along the vacuum area 906 of the vacuum head 902. One or more controlled vacuum force(s) may selectively be applied to respective ones of the first, second, third, fourth, fifth, sixth, seventh and/or eighth vacuum regions 908, 910, 912, 914, 916, 918, 920, 922 via corresponding vacuum orifices extending from the front side 904 of the vacuum head 902 to an example rear side 1004 of the vacuum head 902 located opposite the front side 904.

For example, a first controlled vacuum force may selectively be applied to the first vacuum region 908 via a first example vacuum orifice 924, a second controlled vacuum force may selectively be applied to the second vacuum region 910 via a second example vacuum orifice 926, a third controlled vacuum force may selectively be applied to the third vacuum region 912 via a third example vacuum orifice 928, a fourth controlled vacuum force may selectively be applied to the fourth vacuum region 914 via a fourth example vacuum orifice 930, a fifth controlled vacuum force may selectively be applied to the fifth vacuum region 916 via a fifth example vacuum orifice 932, a sixth controlled vacuum force may selectively be applied to the sixth vacuum region 918 via a sixth example vacuum orifice 934, a seventh controlled vacuum force may selectively be applied to the seventh vacuum region 920 via a seventh example vacuum orifice 936, and an eighth controlled vacuum force may selectively be applied to the eighth vacuum region 922 via an eighth example vacuum orifice 938. The controlled vacuum force(s) to be selectively applied to respective ones of the first, second, third, fourth, fifth, sixth, seventh and/or eighth vacuum regions 908, 910, 912, 914, 916, 918, 920, 922 may be generated by one or more vacuum generator(s) operatively coupled to respective ones of the first, second, third, fourth, fifth, sixth, seventh and/or eighth vacuum orifices 924, 926, 928, 930, 932, 934, 936, 938.

The selective application of one or more controlled vacuum force(s) at one or more of the first, second, third, fourth, fifth, sixth, seventh and/or eighth vacuum region(s) 908, 910, 912, 914, 916, 918, 920, 922 of the vacuum head 902 of FIGS. 9 and 10 enables one or more desired portion(s) of a vacuum surface covering the vacuum area 906 to pick up and/or hold one or more thermoplastic part(s). Respective ones of the first, second, third, fourth, fifth, sixth, seventh and/or eighth vacuum region(s) 908, 910, 912, 914, 916, 918, 920, 922 may be individually controlled, thereby allowing for individual thermoplastic parts of various sizes and/or multiple thermoplastic parts to be selectively picked up via a vacuum surface covering the vacuum area 906 of the vacuum head 902.

Figure 11:
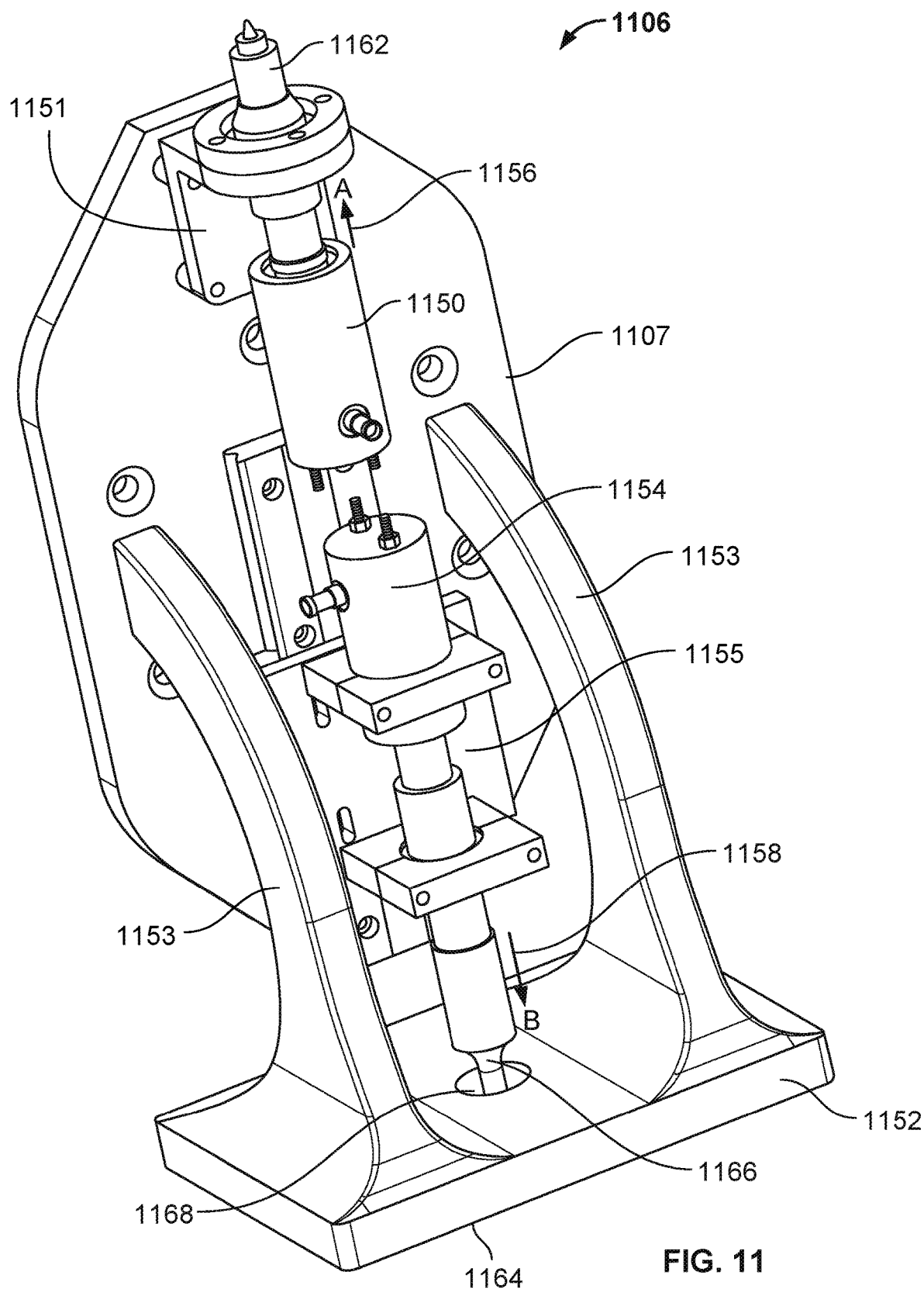
FIG. 11 is a perspective view of an example end effector that may be implemented as part of the example multifunction end effector apparatus of FIGS. 2-8.
Figure 12:
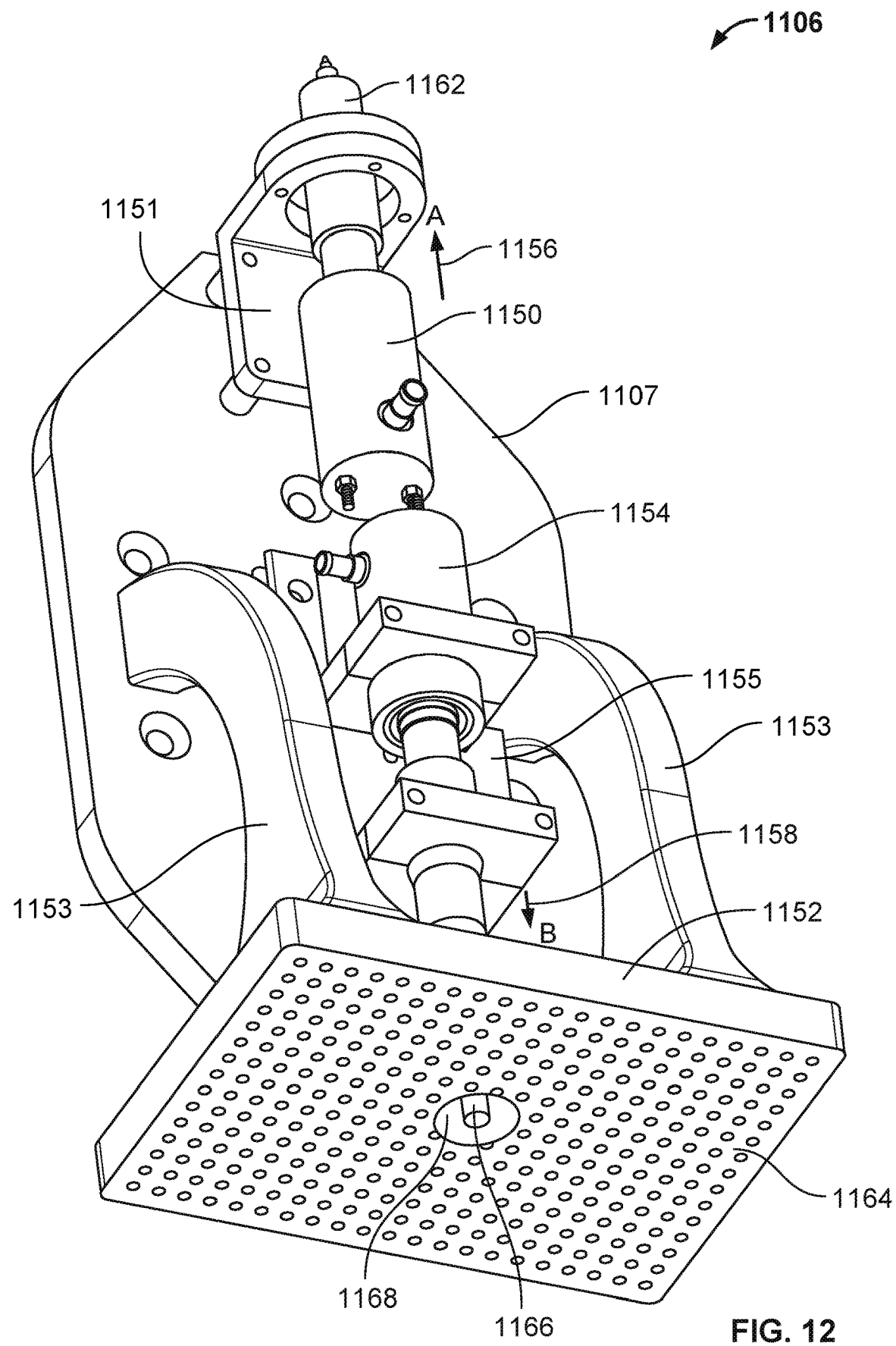
FIG. 12 is another perspective view of the example end effector of FIG. 11.

FIG. 11 is a perspective view of an example end effector 1106 that may be implemented as part of the example multifunction end effector apparatus 202 of FIGS. 2-8. FIG. 12 is another perspective view of the example end effector 1106 of FIG. 11. The end effector 1106 of FIGS. 11 and 12 may be implemented as an alternative to the example end effector 206 of FIGS. 2-8 described above, and may be implemented in an environment of use such as the example environment of use 100 of FIG. 1 described above.

The end effector 1106 of FIGS. 11 and 12 includes an example frame 1107 that is rigidly couplable to a robot (not shown in FIGS. 11 and 12) such as to the example robot 104 of FIG. 1, or to the example rotatable wrist segment 205 of the example robot 204 of FIGS. 2 and 3 described above. In some examples, the robot to which the frame 1107 of the end effector 1106 is to be rigidly coupled may be a jointed arm six-axis robot capable of moving (e.g., translating, rotating, etc.) the end effector 1106 of FIGS. 11 and 12 into various positions and/or locations within an environment of use. In other examples, the robot to which the frame 1107 of the end effector 1106 is to be rigidly coupled may be of a different type, structure and/or configuration capable of moving the end effector 1106 of FIGS. 11 and 12 into various positions and/or locations within an environment of use.

The end effector 1106 of FIGS. 11 and 12 includes a plurality of functional heads to respectively perform one or more function(s), operation(s) and/or process(es) associated with assembling one or more thermoplastic composite articles. More specifically, the end effector 1106 of FIGS. 11 and 12 includes an example cutting head 1150 rigidly coupled to the frame 1107 via an example mounting bracket 1151, an example vacuum head 1152 rigidly coupled to the frame 1107 via example mounting arms 1153, and an example welding head 1154 rigidly coupled to the frame 1107 via an example mounting bracket 1155. In the illustrated example of FIGS. 11 and 12, the cutting head 1150 is operatively positioned on the frame 1107 of the end effector 1106 in a first direction generally indicated by a first example directional arrow 1156 referenced as directional arrow "A" in FIGS. 11 and 12. The vacuum head 1152 is operatively positioned on the frame 1107 of the end effector 1106 in a second direction generally indicated by a second example directional arrow 1158 referenced as directional arrow "B" in FIGS. 11 and 12. The welding head 1154 is also operatively positioned on the frame 1107 of the end effector 1106 in the second direction. In the illustrated example of FIGS. 11 and 12, the first direction (e.g., directional arrow "A") at which the cutting head 1150 is operatively positioned on the frame 1107 of the end effector 1106 is opposite the second direction (e.g., directional arrow "B") at which the vacuum head 1152 and the welding head 1154 are commonly operatively positioned on the frame 1107 of the end effector 1106.

In other examples, one or more of the cutting head 1150, the vacuum head 1152, and/or the welding head 1154 may be operatively positioned on the frame 1107 of the end effector 1106 in a direction that differs from that shown in FIGS. 11 and 12. For example, the operative positioning of the cutting head 1150 may be rotated by ninety degrees such that the cutting head 1150 is operatively positioned on the end effector 1106 in a third direction that is orthogonal to both the first directional arrow 1156 referenced as directional arrow "A" in FIGS. 11 and 12 and the second directional arrow 1158 referenced as directional arrow "B" in FIGS. 11 and 12. When operatively positioned on the frame 1107 of the end effector 1106 in the third direction (e.g., orthogonal to directional arrow "A" and directional arrow "B"), the cutting head 1150 may be in line with, and/or rotatable about, an axis of rotation of a rotatable wrist segment of a robot to which the frame 1107 of the end effector 1106 is rigidly coupled. In such a configuration, the rotatable wrist segment of the robot may function as a rotary positioner to guide the cutting head 1150.

The cutting head 1150 of the end effector 1106 of FIGS. 11 and 12 includes an example ultrasonic cutter 1162 (e.g., an ultrasonic knife) to cut one or more thermoplastic part(s). The ultrasonic cutter 1162 and/or, more generally, the cutting head 1150 may be powered, controlled and/or operated by an ultrasonic power supply (not shown in FIGS. 11 and 12). In some examples, the ultrasonic power supply may be mounted to and/or on the end effector 1106 and/or the robot of the multifunction end effector apparatus of which the end effector 1106 is a part. In other examples, the ultrasonic power supply may be positioned at a remote location relative to the end effector 1106 and/or the robot of the multifunction end effector apparatus of which the end effector 1106 is a part. Regardless of its location, the ultrasonic power supply is operatively coupled to the ultrasonic cutter 1162 of the cutting head 1150 to enable the ultrasonic cutter 1162 to cut one or more thermoplastic part(s). In some examples, the ultrasonic power supply is adjustable such that the ultrasonic cutter 1162 may operate at different (e.g., adjustable) power settings depending upon material and/or specification requirements associated with the cutting operation to be performed.

The vacuum head 1152 of the end effector 1106 of FIGS. 11 and 12 includes an example vacuum surface 1164 to selectively pick up and/or hold one or more thermoplastic part(s) in response to one or more controlled vacuum force(s) applied at the vacuum surface 1164. In some examples, the vacuum surface 1164 is formed from a sintered porous plastic material through which one or more vacuum force(s) may pass. The vacuum force(s) to be applied at the vacuum surface 1164 of the vacuum head 1152 may be generated and/or controlled by one or more vacuum generator(s) (not shown in FIGS. 11 and 12). In some examples, the one or more vacuum generator(s) may be mounted to and/or on the end effector 1106 and/or the robot of the multifunction end effector apparatus of which the end effector 1106 is a part. In other examples, the vacuum generator(s) may be positioned at a remote location relative to the end effector 1106 and/or the robot of the multifunction end effector apparatus of which the end effector 1106 is a part. Regardless of its/their respective location(s), the vacuum generator(s) is/are operatively coupled to the vacuum head 1152 to enable the vacuum surface 1164 of the vacuum head 1152 to selectively pick up and/or hold one or more thermoplastic part(s) in response to one or more vacuum force(s) applied at the vacuum surface 1164.

In some examples, the vacuum force(s) generated by the vacuum generator(s) of the vacuum head 1152 is/are controllable and/or adjustable to enable the vacuum surface 1164 of the vacuum head 1152 to selectively pick up a desired number of thermoplastic parts (e.g., one thermoplastic part, two thermoplastic parts, etc.) from among a stack (e.g., multiple plies) of thermoplastic parts. For example, a relatively greater vacuum force generated by the vacuum generator(s) may result in the vacuum surface 1164 of the vacuum head 1152 picking up a greater number of thermoplastic parts (e.g., two plies and/or two stacked thermoplastic parts) from within a stack of thermoplastic parts, while a relatively lower vacuum force generated by the vacuum generator(s) may result in the vacuum surface 1164 of the vacuum head 1152 picking up a lesser number of thermoplastic parts (e.g., a single ply and/or a single part) from within the stack of thermoplastic parts.

In some examples, the vacuum head 1152 includes a plurality of vacuum regions (not shown in FIGS. 11 and 12) arranged and/or positioned along the vacuum surface 1164 of the vacuum head 1152 to which one or more vacuum force(s) may selectively be applied. Selective application of one or more vacuum force(s) at one or more corresponding vacuum region(s) along the vacuum surface 1164 enables one or more desired portion(s) and/or area(s) of the vacuum surface 1164 to pick up and/or hold one or more thermoplastic part(s). Respective ones of the vacuum regions may be individually controlled, thereby allowing for individual thermoplastic parts of various sizes and/or multiple thermoplastic parts to be selectively picked up via the vacuum surface 1164 of the vacuum head 1152. An example vacuum head having selectively operable vacuum regions arranged along a vacuum surface of the vacuum head is described above in connection with FIGS. 9 and 10.

In some examples, the vacuum head 1152 is to hold one or more thermoplastic part(s) in place relative to the vacuum surface 1164 while the one or more thermoplastic part(s) is/are moved from a first location to a second location. In some examples, the vacuum head 1152 of FIGS. 11 and 12 may include one or more vacuum-controlled suction cup(s) arranged on the vacuum head 1152. In some examples, the vacuum-controlled suction cup(s) may be arranged along the vacuum surface 1164 of the vacuum head 1152. In some examples, the vacuum-controlled suction cup(s) may themselves form and/or be the vacuum surface 1164 of the vacuum head 1152. In some examples, the vacuum-controlled suction cup(s) may be laterally offset from the vacuum surface 1164 of the vacuum head 1152 such that the vacuum-controlled suction cup(s) contact one or more portion(s) of a thermoplastic part of a size that is greater than the size of the vacuum surface 1164 of the vacuum head 1152. The vacuum-controlled suction cup(s) may assist the vacuum head 1152 in holding the one or more thermoplastic part(s) in place relative to the vacuum surface 1164 while the one or more thermoplastic part(s) is/are moved from the first location to the second location. In some examples, the vacuum head 1152 is to place a first thermoplastic part in contact with a second thermoplastic part at the second location. In some examples, the vacuum head 1152 is to hold the first thermoplastic part in place relative to the second thermoplastic part at the second location.

The welding head 1154 of the end effector 1106 of FIGS. 11 and 12 includes an example ultrasonic welder 1166 to weld one thermoplastic part to another thermoplastic part to form a thermoplastic composite article. The ultrasonic welder 1166 and/or, more generally, the welding head 1154 may be powered, controlled and/or operated by an ultrasonic power supply (not shown in FIGS. 11 and 12). In some examples, the ultrasonic power supply that powers, controls and/or operates the ultrasonic welder 1166 and/or welding head 1154 may be the same ultrasonic power supply that powers, controls and/or operates the ultrasonic cutter 1162 and/or cutting head 1150, as described above. In some examples, the ultrasonic power supply may be mounted to and/or on the end effector 1106 and/or the robot of the multifunction end effector apparatus of which the end effector 1106 is a part. In other examples, the ultrasonic power supply may be positioned at a remote location relative to the end effector 1106 and/or the robot of the multifunction end effector apparatus of which the end effector 1106 is a part. Regardless of its location, the ultrasonic power supply is operatively coupled to the ultrasonic welder 1166 of the welding head 1154 to enable the ultrasonic welder 1166 to weld one thermoplastic part to another thermoplastic part. In some examples, the ultrasonic power supply is adjustable such that the ultrasonic welder 1166 may operate at different (e.g., adjustable) power settings depending upon material and/or specification requirements associated with the welding operation to be performed.

In the illustrated example of FIGS. 11 and 12, the ultrasonic welder 1166 of the welding head 1154 extends through an example aperture 1168 formed in the vacuum head 1152 of the end effector 1106. As a result, the ultrasonic welder 1166 of the welding head 1154 is capable of welding a first thermoplastic part to a second thermoplastic part while the vacuum surface 1164 of the vacuum head 1152 holds the first thermoplastic part in place relative to the vacuum surface 1164 and/or relative to the second thermoplastic park.

In some examples, the ultrasonic welder 1166 of the welding head 1154 is movable relative to the frame 1107 of the end effector 1106. For example, the ultrasonic welder 1166 may be movable along the second direction generally indicated by the second example directional arrow 1158 referenced as directional arrow "B" in FIGS. 11 and 12. In some examples, the ultrasonic welder 1166 may be coupled to the welding head 1154 in a spring-loaded manner that causes movement of the ultrasonic welder 1166 relative to the welding head 1154 and/or, more generally, relative to the frame 1107 of the end effector 1106. In other examples, the ultrasonic welder 1166 may be coupled to an air cylinder that causes movement of the ultrasonic welder 1166 relative to the welding head 1154 and/or, more generally, relative to the frame 1107 of the end effector 1106. In some examples, movement of the ultrasonic welder 1166 enables the force at which the ultrasonic welder 1166 operates (e.g., the force at which the ultrasonic welder 1166 welds a first thermoplastic part to a second thermoplastic part) to be adjustable depending upon material and/or specification requirements associated with the welding operation to be performed.

The end effector 1106 of FIGS. 11 and 12 may be moved (e.g., via a robot) within an environment of use such that one or more of the ultrasonic cutter 1162 of the cutting head 1150, the vacuum surface 1164 of the vacuum head 1152, or the ultrasonic welder 1166 of the welding head 1154 is/are in contact with one or more thermoplastic workpieces at any given time in conjunction with assembling a thermoplastic composite article. In some examples, the thermoplastic workpiece is a sheet and/or ply (or stacked sheets and/or plies) of thermoplastic material from which one or more thermoplastic part(s) is/are to be cut. In some examples, the thermoplastic workpiece is a thermoplastic part to be incorporated into a thermoplastic sub-assembly and/or into a finished thermoplastic composite article. In some examples, the thermoplastic workpiece is a thermoplastic sub-assembly to be incorporated into a finished thermoplastic composite article.

Figure 13:
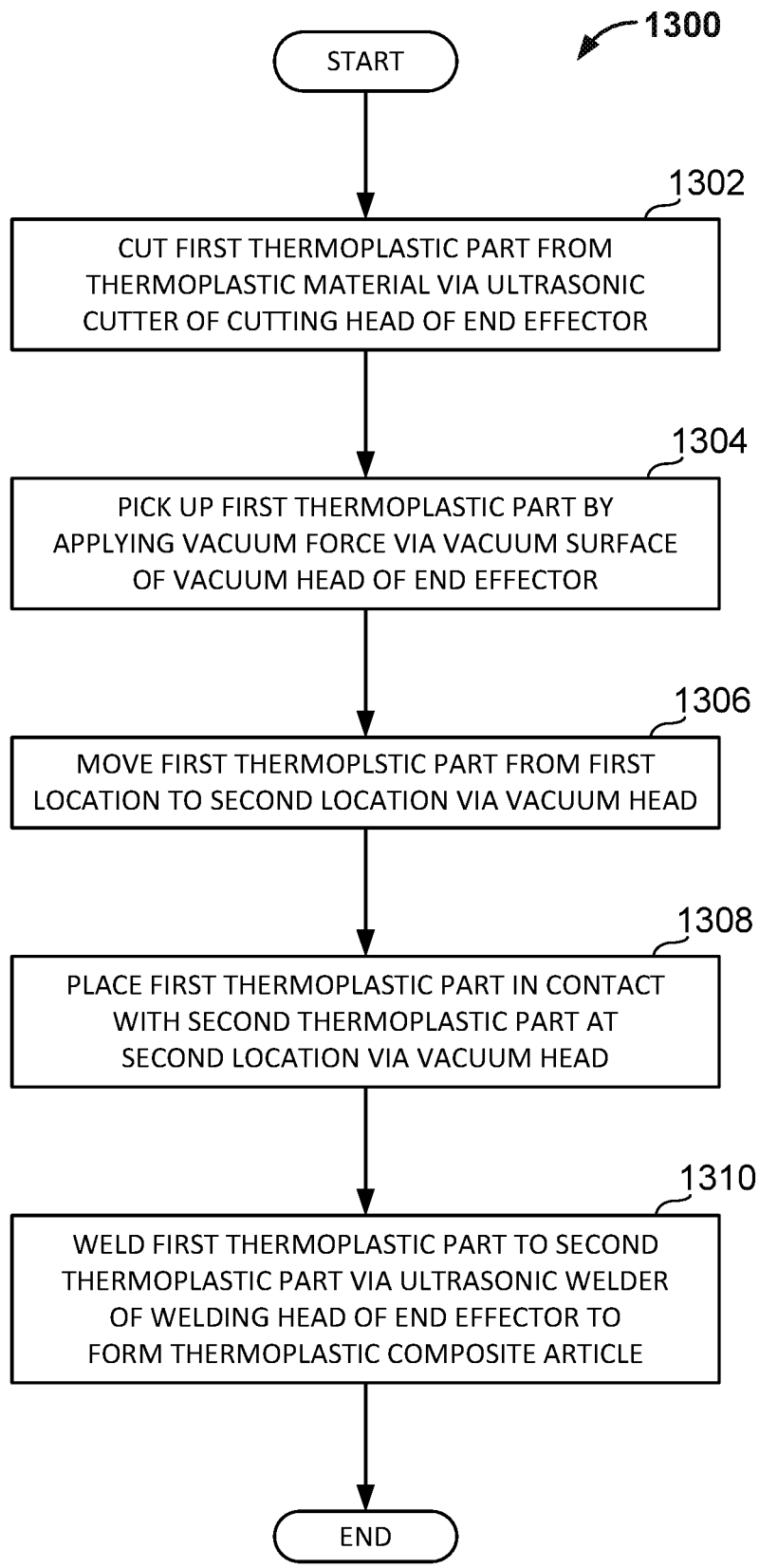
FIG. 13 is a flowchart representative of an example method for implementing the example multifunction end effector apparatus of FIGS. 2-8 to assemble a thermoplastic composite article.

FIG. 13 is a flowchart representative of an example method 1300 for implementing the example multifunction end effector apparatus 202 of FIGS. 2-8 to assemble a thermoplastic composite article. The method 1300 of FIG. 13 may be implemented via the example end effector 206 of FIGS. 2-8 or the example end effector 1106 of FIGS. 11-12, as programmed and/or controlled via a robot such as the example robot 204 of FIGS. 2-8.

The method 1300 of FIG. 13 begins with cutting a first thermoplastic part from a thermoplastic material via an ultrasonic cutter of a cutting head of an end effector (block 1302). For example, the ultrasonic cutter 262 of the cutting head 250 of the end effector 206 of FIGS. 2-8 may cut a first thermoplastic part (e.g., the first thermoplastic part 604 of FIG. 6) from a roll, sheet and/or ply of thermoplastic material (e.g., the thermoplastic material 602 of FIG. 6). As another example, the ultrasonic cutter 1162 of the cutting head 1150 of the end effector 1106 of FIGS. 11 and 12 may cut a first thermoplastic part from a roll, sheet and/or ply of thermoplastic material.

The method 1300 of FIG. 13 includes picking up the first thermoplastic part by applying a vacuum force to the first thermoplastic part via a vacuum surface of a vacuum head of the end effector (block 1304). For example, the vacuum head 252 of the end effector 206 of FIGS. 2-8 may pick up the first thermoplastic part (e.g., the first thermoplastic part 604 of FIG. 6) by applying a vacuum force to the first thermoplastic part via the vacuum surface 264 of the vacuum head 252. As another example, the vacuum head 1152 of the end effector 1106 of FIGS. 11 and 12 may pick up the first thermoplastic part by applying a vacuum force to the first thermoplastic part via the vacuum surface 1164 of the vacuum head 1152 of FIGS. 11 and 12.

The method 1300 of FIG. 13 includes moving the first thermoplastic part from a first location to a second location via the vacuum head of the end effector (block 1306). For example, the vacuum head 252 of the end effector 206 of FIGS. 2-8, via the vacuum surface 264 of the vacuum head 252, may move the first thermoplastic part (e.g., the first thermoplastic part 604 of FIG. 6) from a first location (e.g., a location on a material presentation table) to a second location (a location on a sub-assembly table or on a finished composite article table). As another example, the vacuum head 1152 of the end effector 1106 of FIGS. 11 and 12, via the vacuum surface 1164 of the vacuum head 1152 of FIGS. 11 and 12, may move the first thermoplastic part from a first location (e.g., a location on a material presentation table) to a second location (a location on a sub-assembly table or on a finished composite article table).

The method 1300 of FIG. 13 includes placing the first thermoplastic part in contact with a second thermoplastic part at the second location via the vacuum head of the end effector (block 1308). For example, the vacuum head 252 of the end effector 206 of FIGS. 2-8, via the vacuum surface 264 of the vacuum head 252, may place the first thermoplastic part (e.g., the first thermoplastic part 604 of FIG. 6) in contact with a second thermoplastic part (e.g., the second thermoplastic part 702 of FIG. 7) at the second location. As another example, the vacuum head 1152 of the end effector 1106 of FIGS. 11 and 12, via the vacuum surface 1164 of the vacuum head 1152 of FIGS. 11 and 12, may place the first thermoplastic part in contact with a second thermoplastic part at the second location.

The method 1300 of FIG. 13 includes welding the first thermoplastic part to the second thermoplastic part via an ultrasonic welder of a welding head of the end effector to form a thermoplastic composite article (block 1310). For example, the ultrasonic welder 266 of the welding head 254 of the end effector 206 of FIGS. 2-8 may weld the first thermoplastic part (e.g., the first thermoplastic part 604 of FIG. 6 or the first thermoplastic part 802 of FIG. 8) to the second thermoplastic part (e.g., the second thermoplastic part 702 of FIG. 7 or the second thermoplastic part 804 of FIG. 8) to form a thermoplastic composite article (e.g., the thermoplastic composite article 806 of FIG. 8). As another example, the ultrasonic welder 1166 of the welding head 1154 of the end effector 1106 of FIGS. 11 and 12 may weld the first thermoplastic part to the second thermoplastic part to form a thermoplastic composite article. In some examples, the formed thermoplastic composite article may be a thermoplastic sub-assembly. In other examples, the formed thermoplastic composite article may be a finished (e.g., fully-assembled) thermoplastic composite article. Following block 1310, the example method 1300 of FIG. 13 ends.

From the foregoing, it will be appreciated that the disclosed multifunction end effector apparatus and methods advantageously reduce (e.g., eliminate) the need for human involvement in the cutting, picking up, placing, stacking, laying up and/or welding aspects of assembling thermoplastic composite articles. As a result of reducing the extent of human involvement in the assembly process, the accuracy and repeatability of the assembly process is improved.

In some examples, an apparatus for assembling a thermoplastic composite article is disclosed. In some disclosed examples, the apparatus comprises a robot and an end effector coupled to the robot. In some disclosed examples, the end effector includes a cutting head, a vacuum head, and a welding head.

In some disclosed examples, the cutting head includes an ultrasonic cutter to cut a first thermoplastic part. In some disclosed examples, the vacuum head includes a vacuum surface to pick up the first thermoplastic part in response to a vacuum force applied at the vacuum surface. In some disclosed examples, the vacuum head includes a plurality of selectively operable vacuum regions arranged along the vacuum surface of the vacuum head. In some disclosed examples, the vacuum head is to hold the first thermoplastic part in place relative to the vacuum surface while the first thermoplastic part is moved from a first location to a second location. In some disclosed examples, the vacuum head is to place the first thermoplastic part in contact with a second thermoplastic part at the second location. In some disclosed examples, the welding head includes an ultrasonic welder to weld the first thermoplastic part to the second thermoplastic part to form the thermoplastic composite article.

In some disclosed examples, the thermoplastic composite article is a thermoplastic sub-assembly. In some disclosed examples, the thermoplastic composite article is a fully-assembled thermoplastic composite article.

In some disclosed examples, the cutting head is operatively positioned on the end effector in a first direction. In some disclosed examples, the vacuum head is operatively positioned on the end effector in a second direction different from the first direction. In some disclosed examples, the welding head is operatively positioned on the end effector in a third direction different from the first direction and different from the second direction.

In some disclosed examples, the vacuum surface of the vacuum head includes an aperture. In some disclosed examples, the ultrasonic welder of the welding head extends through the aperture. In some disclosed examples, the cutting head is operatively positioned on the end effector in a first direction. In some disclosed examples, the vacuum head is operatively positioned on the end effector in a second direction different from the first direction. In some disclosed examples, the welding head is operatively positioned on the end effector in the second direction.

In some disclosed examples, an apparatus for assembling a thermoplastic composite article comprises a robot and an end effector coupled to the robot. In some disclosed examples, the end effector comprises a cutting head including an ultrasonic cutter to cut a first thermoplastic part. In some disclosed examples, the end effector comprises a vacuum head including a vacuum surface to pick up the first thermoplastic part in response to a vacuum force applied at the vacuum surface. In some disclosed examples, the end effector comprises a welding head including an ultrasonic welder to weld the first thermoplastic part to a second thermoplastic part to form the thermoplastic composite article.

In some disclosed examples, the vacuum head includes a plurality of selectively operable vacuum regions arranged along the vacuum surface of the vacuum head. In some disclosed examples, the vacuum head is to hold the first thermoplastic part in place relative to the vacuum surface while the first thermoplastic part is moved from a first location to a second location. In some disclosed examples, the vacuum head is to place the first thermoplastic part in contact with the second thermoplastic part at the second location.

In some disclosed examples, the cutting head is operatively positioned on the end effector in a first direction. In some disclosed examples, the vacuum head is operatively positioned on the end effector in a second direction different from the first direction. In some disclosed examples, the welding head is operatively positioned on the end effector in a third direction different from the first direction and different from the second direction.

In some disclosed examples, the vacuum surface of the vacuum head includes an aperture. In some disclosed examples, the ultrasonic welder of the welding head extends through the aperture. In some disclosed examples, the cutting head is operatively positioned on the end effector in a first direction. In some disclosed examples, the vacuum head is operatively positioned on the end effector in a second direction different from the first direction. In some disclosed examples, the welding head is operatively positioned on the end effector in the second direction.

In some examples, a method for assembling a thermoplastic composite article via an end effector coupled to a robot is disclosed. In some disclosed examples, the method comprises cutting a first thermoplastic part from a thermoplastic material via an ultrasonic cutter of a cutting head of the end effector. In some disclosed examples, the method comprises picking up the first thermoplastic part by applying a vacuum force to the first thermoplastic part via a vacuum surface of a vacuum head of the end effector. In some disclosed examples, the method comprises moving the first thermoplastic part from a first location to a second location via the vacuum head. In some disclosed examples, the method comprises placing the first thermoplastic part in contact with a second thermoplastic part via the vacuum head. In some disclosed examples, the second thermoplastic part is located at the second location. In some disclosed examples, the method comprises welding the first thermoplastic part to the second thermoplastic part via an ultrasonic welder of a welding head of the end effector to form the thermoplastic composite article.

In some disclosed examples of the method, the cutting head is operatively positioned on the end effector in a first direction. In some disclosed examples of the method, the vacuum head is operatively positioned on the end effector in a second direction different from the first direction. In some disclosed examples of the method, the welding head is operatively positioned on the end effector in a third direction different from the first direction and different from the second direction.

In some disclosed examples of the method, the vacuum surface of the vacuum head includes an aperture. In some disclosed examples of the method, the ultrasonic welder of the welding head extends through the aperture. In some disclosed examples of the method, the cutting head is operatively positioned on the end effector in a first direction. In some disclosed examples of the method, the vacuum head is operatively positioned on the end effector in a second direction different from the first direction. In some disclosed examples of the method, the welding head is operatively positioned on the end effector in the second direction.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for assembling a thermoplastic composite article, the apparatus comprising:
   a robot including a rotatable wrist segment; and
   an end effector including:
      a frame rigidly coupled to the rotatable wrist segment;
      a cutting head rigidly coupled to the frame, the cutting head having an ultrasonic cutter operatively positioned in a first direction;
      a vacuum head rigidly coupled to the frame, the vacuum head having a vacuum surface operatively positioned in a second direction different from the first direction, the vacuum surface being stationary relative to the frame; and
      a welding head rigidly coupled to the frame, the welding head having an ultrasonic welder operatively positioned in a third direction aligned with and facing away from the first direction, the ultrasonic welder being movable relative to the frame along the third direction.

2. The apparatus of claim 1, wherein the ultrasonic cutter is configured to cut a first thermoplastic part from a thermoplastic material.

3. The apparatus of claim 2, wherein the vacuum surface is configured to pick up the first thermoplastic part in response to a vacuum force applied at the vacuum surface.

4. The apparatus of claim 1, wherein the vacuum head includes a plurality of vacuum regions arranged along the vacuum surface of the vacuum head, and wherein respective ones of the plurality of vacuum regions are selectively operable and individually controllable.

5. The apparatus of claim 3, wherein the vacuum head is configured to hold the first thermoplastic part in place relative to the vacuum surface while the first thermoplastic part is moved from a first location to a second location, the vacuum head further configured to place the first thermoplastic part in contact with a second thermoplastic part at the second location.

6. The apparatus of claim 5, wherein the ultrasonic welder is configured to weld the first thermoplastic part to the second thermoplastic part to form the thermoplastic composite article.

7. The apparatus of claim 6, wherein the thermoplastic composite article is a thermoplastic sub-assembly.

8. The apparatus of claim 6, wherein the thermoplastic composite article is a fully-assembled thermoplastic composite article.

9. The apparatus of claim 1, wherein the vacuum surface includes an aperture, the ultrasonic welder being extendible through the aperture in response to movement of the ultrasonic welder along the third direction, the second direction being aligned with and facing toward the third direction.

10. An apparatus for assembling a thermoplastic composite article, the apparatus comprising:
    a robot including a rotatable wrist segment; and
    an end effector comprising:
       a frame rigidly coupled to the rotatable wrist segment;
       a cutting head rigidly coupled to the frame, the cutting head including an ultrasonic cutter configured to cut a first thermoplastic part from a thermoplastic material the ultrasonic cutter operatively positioned in a first direction;
       a vacuum head rigidly coupled to the frame, the vacuum head including a vacuum surface configured to pick up the first thermoplastic part in response to a vacuum force applied at the vacuum surface, the vacuum surface operatively positioned in a second direction different from the first direction, the vacuum surface being stationary relative to the frame; and
       a welding head rigidly coupled to the frame, the welding head including an ultrasonic welder configured to weld the first thermoplastic part to a second thermoplastic part to form the thermoplastic composite article, the ultrasonic welder operatively positioned in a third direction aligned with and facing away from the first direction, the ultrasonic welder being movable relative to the frame along the third direction.

11. The apparatus of claim 10, wherein the vacuum head includes a plurality of vacuum regions arranged along the vacuum surface of the vacuum head, and wherein respective ones of the plurality of vacuum regions are selectively operable and individually controllable.

12. The apparatus of claim 10, wherein the vacuum head is configured to hold the first thermoplastic part in place relative to the vacuum surface while the first thermoplastic part is moved from a first location to a second location, the vacuum head further configured to place the first thermoplastic part in contact with the second thermoplastic part at the second location.

13. The apparatus of claim 10, wherein the vacuum surface includes an aperture, the ultrasonic welder being extendible through the aperture in response to movement of the ultrasonic welder along the third direction, the second direction being aligned with and facing toward the third direction.

14. The apparatus of claim 1, wherein the robot is a jointed arm six-axis robot.

15. The apparatus of claim 1, wherein the second direction is orthogonal to the first direction and the third direction.

16. An apparatus for assembling a thermoplastic composite article, the apparatus comprising:
    a jointed arm six-axis robot having a rotatable wrist segment; and an end effector comprising:
- a frame rigidly coupled to the rotatable wrist segment;
- a cutting head rigidly coupled to the frame, the cutting head including an ultrasonic cutter configured to cut a first thermoplastic part from a thermoplastic material, the ultrasonic cutter operatively positioned in a first direction;
- a vacuum head rigidly coupled to the frame, the vacuum head including a vacuum surface configured to pick up the first thermoplastic part in response to a vacuum force applied at the vacuum surface via at least one of a plurality of vacuum regions arranged along the vacuum surface of the vacuum head, respective ones of the plurality of vacuum regions being selectively operable and individually controllable, the vacuum surface operatively positioned in a second direction different from the first direction, the vacuum surface being stationary relative to the frame; and
- a welding head rigidly coupled to the frame, the welding head including an ultrasonic welder configured to weld the first thermoplastic part to a second thermoplastic part to form the thermoplastic composite article, the ultrasonic welder operatively positioned in a third direction aligned with and facing away from the first direction, the ultrasonic welder being movable relative to the frame along the third direction.

17. The apparatus of claim 4, wherein the vacuum surface is a cover extending across and covering the plurality of vacuum regions.

18. The apparatus of claim 17, wherein the vacuum surface is formed from a sintered porous plastic material configured to enable the vacuum force to pass therethrough.

19. The apparatus of claim 17, wherein the vacuum head includes a first side, a second side located opposite the first side, and a plurality of vacuum orifices extending from the second side through to the first side, wherein the first side includes the vacuum regions, and wherein each one of the vacuum regions is coupled to a corresponding one of the vacuum orifices.

20. The apparatus of claim 10, wherein the second direction is orthogonal to the first direction and the third direction.

21. The apparatus of claim 10, wherein the vacuum head includes a plurality of vacuum regions arranged along the vacuum surface of the vacuum head, and wherein respective ones of the plurality of vacuum regions are selectively operable and individually controllable.

22. The apparatus of claim 21, wherein the vacuum surface is a cover extending across and covering the plurality of vacuum regions.

23. The apparatus of claim 22, wherein the vacuum surface is formed from a sintered porous plastic material configured to enable the vacuum force to pass therethrough.

24. The apparatus of claim 22, wherein the vacuum head includes a first side, a second side located opposite the first side, and a plurality of vacuum orifices extending from the second side through to the first side, wherein the first side includes the vacuum regions, and wherein each one of the vacuum regions is coupled to a corresponding one of the vacuum orifices.

* * * * *